United States Patent
Shin et al.

(10) Patent No.: US 11,874,399 B2
(45) Date of Patent: Jan. 16, 2024

(54) 3D SCANNING LIDAR SENSOR

(71) Applicant: YUJIN ROBOT CO., LTD., Incheon (KR)

(72) Inventors: Kyung Chul Shin, Seoul (KR); Seong Ju Park, Gunpo-si (KR); Jae Young Lee, Gunpo-si (KR); Moo Woong Cheon, Anyang-si (KR); Man Yeol Kim, Incheon (KR)

(73) Assignee: YUJIN ROBOT CO., LTD., Incheon (KR)

( * ) Notice: Subject to any disclaimer, the term of this patent is extended or adjusted under 35 U.S.C. 154(b) by 1263 days.

(21) Appl. No.: 16/412,417

(22) Filed: May 15, 2019

(65) Prior Publication Data
US 2019/0353758 A1    Nov. 21, 2019

(30) Foreign Application Priority Data

May 16, 2018  (KR) .................. 10-2018-0055952
Jun. 26, 2018  (KR) .................. 10-2018-0073235
(Continued)

(51) Int. Cl.
*G01S 17/10*  (2020.01)
*H04B 1/38*  (2015.01)
(Continued)

(52) U.S. Cl.
CPC ............ *G01S 7/4817* (2013.01); *F16H 61/00* (2013.01); *G01S 7/4813* (2013.01); *G01S 17/10* (2013.01); *H04B 1/38* (2013.01)

(58) Field of Classification Search
CPC ...... G01S 7/4817; G01S 7/4813; G01S 17/10; F16H 61/00
(Continued)

(56) References Cited

U.S. PATENT DOCUMENTS

| 4,297,030 A | 10/1981 | Chaborski et al. |
| 6,925,679 B2 | 8/2005 | Wallach et al. |

(Continued)

FOREIGN PATENT DOCUMENTS

| CN | 101856208 A1 | 10/2010 |
| CN | 206400103 A1 | 8/2017 |

(Continued)

OTHER PUBLICATIONS

Feng Li, Jingyi Yu and Jinxiang Chai, A Hybrid Camera for Motion Deblurring and Depth Map Super-Resolution, IEEE computer society conference on computer vision and pattern recognition, Jun. 2008, pp. 1-8.

(Continued)

*Primary Examiner* — Ted M Wang
(74) *Attorney, Agent, or Firm* — BROADVIEW IP LAW, PC

(57) ABSTRACT

Disclosed is a Light Detection and Ranging (LIDAR) sensor which is capable of minimizing the size of a LIDAR sensor which is capable of performing 3D scanning and setting a region of interest for obtaining point cloud data with the removal of light scattering, by separating a transmitter module and a receiver module; disposing a transmitter, a mirror, and a receiver in a specific space so that light emitted from a light source or light reflected from a transmission mirror is reflected from a first reflection region of a moving mirror and is then moved to a target object, after which light reflected from the target object is reflected from a second reflection region of the moving mirror and is moved to the transmission mirror or a photodiode; installing a blocking wall separating movement paths of light; and adjusting the range of movement of the moving mirror.

14 Claims, 21 Drawing Sheets

(30)  Foreign Application Priority Data

Feb. 15, 2019  (KR) .................. 10-2019-0018126
Feb. 15, 2019  (KR) .................. 10-2019-0018127

(51) Int. Cl.
  *G01S 7/481*  (2006.01)
  *F16H 61/00*  (2006.01)
(58) Field of Classification Search
  USPC ........................................ 398/128
  See application file for complete search history.

(56)  References Cited

U.S. PATENT DOCUMENTS

| | | | |
|---|---|---|---|
| 7,695,646 | B2 | 4/2010 | Wang et al. |
| 9,020,637 | B2 | 4/2015 | Schnittman et al. |
| 9,047,896 | B1 | 6/2015 | Kudo et al. |
| 9,411,338 | B2 | 8/2016 | Hanaoka et al. |
| 9,527,212 | B2 | 12/2016 | Artes et al. |
| 9,741,140 | B2 | 8/2017 | Birchfield |
| 10,822,415 | B2 | 11/2020 | Levade et al. |
| 11,090,491 | B2 | 8/2021 | Mishra et al. |
| 2011/0285910 | A1 | 11/2011 | Bamji et al. |
| 2012/0182392 | A1 | 7/2012 | Kearns et al. |
| 2012/0206050 | A1* | 8/2012 | Spero ............ B60Q 1/1423 |
| | | | 315/152 |
| 2014/0111812 | A1 | 4/2014 | Baeg et al. |
| 2014/0125966 | A1 | 5/2014 | Phillips et al. |
| 2014/0198308 | A1 | 7/2014 | Kim |
| 2014/0300732 | A1 | 10/2014 | Friend et al. |
| 2015/0253777 | A1 | 9/2015 | Binney et al. |
| 2015/0362921 | A1 | 12/2015 | Hanaoka et al. |
| 2016/0073080 | A1 | 3/2016 | Wagner et al. |
| 2016/0104829 | A1 | 4/2016 | Chang et al. |
| 2016/0339587 | A1 | 11/2016 | Rublee |
| 2017/0046548 | A1 | 2/2017 | Kamijo et al. |
| 2018/0149753 | A1* | 5/2018 | Shin ............ G01S 7/4811 |

FOREIGN PATENT DOCUMENTS

| | | |
|---|---|---|
| DE | 202014100712 A1 | 5/2015 |
| EP | 1503221 A1 | 2/2005 |
| EP | 1619469 A1 | 1/2006 |
| EP | 1906141 A1 | 2/2008 |
| EP | 2790079 A1 | 10/2014 |
| EP | 2890125 A1 | 7/2015 |
| EP | 1619469 A1 | 1/2016 |
| EP | 3165942 A1 | 5/2017 |
| EP | 3179272 A1 | 6/2017 |
| EP | 3309584 A1 | 4/2018 |
| GB | 2494413 A | 3/2013 |
| JP | H06331744 A1 | 12/1994 |
| JP | 2011-145156 A1 | 7/2011 |
| JP | 2012127747 A1 | 7/2012 |
| JP | 2013-224915 A1 | 10/2013 |
| JP | 2013224915 A1 | 10/2013 |
| JP | 2017062398 A1 | 3/2017 |
| KR | 10-1999-0069210 A1 | 9/1999 |
| KR | 10-0698534 A1 | 3/2007 |
| KR | 10-0757937 A1 | 9/2007 |
| KR | 10-0773344 A1 | 11/2007 |
| KR | 10-0785784 A1 | 12/2007 |
| KR | 10-2008-0048260 A1 | 6/2008 |
| KR | 10-0843085 A1 | 7/2008 |
| KR | 2008-0102842 A1 | 11/2008 |
| KR | 10-0919944 A1 | 10/2009 |
| KR | 20100015211 A1 | 2/2010 |
| KR | 10-2010-0031277 A1 | 3/2010 |
| KR | 20100098997 A1 | 9/2010 |
| KR | 10-2011-0010380 A1 | 2/2011 |
| KR | 10-1058571 A1 | 8/2011 |
| KR | 10-2011-0122022 A1 | 11/2011 |
| KR | 10-1083394 A1 | 11/2011 |
| KR | 10-1105737 A1 | 1/2012 |
| KR | 10-1202108 A1 | 11/2012 |
| KR | 10-2013-0020062 A1 | 2/2013 |
| KR | 10-2013-0034573 A1 | 4/2013 |
| KR | 10-2013-0040026 A1 | 4/2013 |
| KR | 10-2013-0140340 A1 | 12/2013 |
| KR | 2013-0137536 A1 | 12/2013 |
| KR | 10-2014-0009737 A1 | 1/2014 |
| KR | 2014-0073177 A1 | 6/2014 |
| KR | 10-2014-0109175 A1 | 9/2014 |
| KR | 2014-0109175 A1 | 9/2014 |
| KR | 10-1483041 A1 | 1/2015 |
| KR | 10-2015-0014237 A1 | 2/2015 |
| KR | 10-2015-0050159 A1 | 5/2015 |
| KR | 10-1552687 A1 | 9/2015 |
| KR | 10-2016-0088147 A1 | 7/2016 |
| KR | 2016-0111571 A1 | 9/2016 |
| KR | 10-02016-0113794 A1 | 10/2016 |
| KR | 2016-0113794 A1 | 10/2016 |
| KR | 10-2017-0008614 A1 | 1/2017 |
| KR | 10-1708659 A1 | 2/2017 |
| KR | 10-1725060 A1 | 4/2017 |
| KR | 20170037197 A1 | 4/2017 |
| KR | 10-2017-0073515 A1 | 6/2017 |
| KR | 10-1775114 A1 | 9/2017 |
| KR | 10-1776620 A1 | 9/2017 |
| KR | 10-1776621 A1 | 9/2017 |
| KR | 10-1776622 A1 | 9/2017 |
| KR | 10-1784183 A1 | 10/2017 |
| WO | 2007025240 A1 | 3/2007 |
| WO | 10-1331790 A1 | 11/2013 |
| WO | 2015155812 A1 | 10/2015 |
| WO | 2016/091291 A1 | 6/2016 |
| WO | 2016/098912 A1 | 6/2016 |
| WO | 2017122529 A1 | 7/2017 |
| WO | 2018130885 A1 | 7/2018 |

OTHER PUBLICATIONS

Jinwook Huh, Woong Sik Chung, Sang Yep Nam and Wan Kyun Chung, International Conference on Intelligent Robots and Systems, ETRI Journal, vol. 29, No. 2, Apr. 2007.
Jun Hwan Jang etc., "Development of a Pulsed Time-of-Flight Based LIDAR for Distance, Shape Measurement and Applications", Spring and Autumn Conference, The Korean Society of Mechanical Engineers, May 2015, pp. 144-145.
Hoonje Woo, Jaehwan Kim, Sanghoon Lee, Byungwoo Kim, Obstacle Avoidance for Unmanned Ground Vehicle using Multiple Laser Scanners, Apr. 2009, pp. 960-965, The Korean Society of Automotive Engineers, Korea.
Jun Hwan Jang, Sung Ui Hwang, Bum Sik Won and Kyi Hwan Park, Development of a Pulsed Time-of-Flight Based LIDAR for Distance, Shape Measurement and Applications, May 2015, pp. 144-145 Spring and Autumn Conference, The Korean Society of Mechanical Engineers, Korea (ROK).
Extended European Search Report for EP22210146.1 by European Patent Office dated Mar. 2, 2023.
Jinwook Huh et al., International Conference on intelligent robots and systems, 2006, pp. 5265-5272.
Feng Li et al., IEEE computer society conference on computer vision and pattern recognition, Jun. 2008, pp. 1-8.
Wikipedia: "Barcode", Aug. 17, 2017, XP055833706, Retrieved from the Internet: URL:https://en.wikipedia.org/w/index.php?title=Barcode&oldid=795974695 [retrieved on Aug. 20, 2021].

* cited by examiner

3D SCANNING LIDAR SENSOR

CROSS-REFERENCE TO RELATED APPLICATIONS

This application claims priority to and the benefit of Korean Patent Application No. 10-2018-0055952 filed in the Korean Intellectual Property Office on May 16, 2018, Korean Patent Application No. 10-2018-0073235 filed in the Korean Intellectual Property Office on Jun. 26, 2018, Korean Patent Application No. 10-2019-0018126 filed in the Korean Intellectual Property Office on Feb. 15, 2019, and Korean Patent Application No. 10-2019-0018127 filed in the Korean Intellectual Property Office on Feb. 15, 2019, the entire contents of which are incorporated herein by reference.

TECHNICAL FIELD

The present invention relates to a Light Detection and Ranging (LIDAR) sensor which scans a three-dimensional space.

BACKGROUND ART

Contents described herein simply provide background information for the present exemplary embodiment, but do not constitute the related art.

Three-dimensional (3D) distance measuring systems measure the distance of a space by using various sensors, such as a Charge Coupled Device (CCD) image sensor, a Complementary Metal Oxide Semiconductor (CMOS) image sensor, an ultrasonic sensor, or a laser sensor.

General 3D distance measuring systems scan a space by rotating a two-dimensional (2D) distance sensor that scans a plane surface including the center of the sensor. Since there is no limit to the cost, size, and sampling rate of a device using 2D distance sensors, there are limits in producing such products commercially, not for study purposes.

A device to which a 2D photodiode array is applied measures a distance by using structure light or time of flight. A method using the structure light is performed by measuring a depth by projecting a unique pattern, detecting a corresponding point, and calculating the depth, while time of flight is a method of measuring a time difference or a phase difference and converting the measured time difference or phase difference into a distance. In devices to which a 2D photodiode arrays are applied, it is difficult to increase the view angle and each pixel has a lot of 3D information, so that a problem arises in that it is difficult to measure a pin point.

A distance measuring device to which a one-dimensional photodiode array is applied includes a photodiode array and a laser diode array (or a laser diode and a diffuser). The photodiode array has a structure in which several hundreds or several thousands of photodiodes are arranged on silicon crystal in a straight line. In the distance measuring device to which a one-dimensional photodiode array is applied, it is difficult to increase the view angle, and many of the modules, such as a diffuser having high efficiency, a sensor array, and a mems mirror, required for the implementation are expensive, leading to a problem in that it is difficult to manufacture the distance measuring device as a commercially available product.

For an easy implementation, an existing Light Detection and Ranging (LIDAR) sensor adopts a specific tube for a transmitter or is implemented in a structure for securing a long distance from the transmitter and a receiver to a mirror. The existing 2D LIDAR sensor has a laser optical tube formed from an emitter to a mirror, and the existing 3D LIDAR sensor adopts a beam adjusting method using a multi-mirror forming a long distance through a specific tube or generating a long distance in a limited region.

The existing LIDAR sensor has excellent performance, but has a problem in cost and size. The existing 3D LIDAR sensor requires a plurality of mirrors having high reflectivity in order to form an efficient beam path, making the existing 3D LIDAR sensors expensive. Conversely, a micro LIDAR has size limitations, so that the existing tube or long distance method cannot be applied to the micro LIDAR.

SUMMARY OF THE INVENTION

The present invention has been made in an effort to minimize the size of a Light Detection and Ranging (LIDAR) sensor which is capable of performing 3D scanning with the removal of light scattering by having a separate transmitter module and a receiver module; disposing a transmitter, a mirror, and a receiver in a specific space so that light emitted from a light source or light reflected from a transmission mirror is reflected from a first reflection region of a moving mirror and is then moved to a target object, after which the light reflected from the target object is reflected from a second reflection region of the moving mirror and is moved to the transmission mirror or a photodiode; installing a blocking wall separating the movement paths of the light; and restricting the range of movement of the moving mirror which is connected to a second gear that is engaged with a first gear connected to a motor which drives movement.

The present invention has also been made in an effort to set a region of interest for obtaining point cloud data by a LIDAR sensor which is capable of performing 3D scanning with the removal of light scattering by having a separate transmitter module and receiver module; disposing a transmitter, a mirror, and a receiver in a specific space so that light emitted from a light source or light reflected from a transmission mirror is reflected from a first reflection region of a moving mirror and is then moved to a target object, after which the light reflected from the target object is reflected from a second reflection region of the moving mirror and is moved to the transmission mirror or a photodiode; installing a blocking wall separating movement paths of light; and restricting the range of movement of the moving mirror.

Other non-specified objects of the present invention may be additionally considered within a range easily derivable on the basis of the following detailed description and the effects thereof.

An exemplary embodiment of the present invention provides an optical transceiver, comprising: a first angle adjusting unit having a first reflection region and a second reflection region; an optical transmitter configured to transmit light to the first reflection region of the first angle adjusting unit; an optical receiver configured to receive light from the second reflection region of the first angle adjusting unit; a first light blocking member configured to separate the movement path of the transmitted light and the movement path of the received light; and a controller configured to transmit a signal to the first angle adjusting unit controlling the operation thereof, in which the first angle adjusting unit comprises: a reflector having the first reflection region and the second reflection region; a first driving unit configured to transfer power to the reflector; a first gear connected to the first driving unit; and a second gear connected to the reflector, which moves while being engaged with the first gear.

The reflector may include a first reflector comprising the first reflection region and a second reflector comprising the second reflection region, and the first and second reflectors may be located in a first and a second space, respectively, which are separated by the first light blocking member.

The first angle adjusting unit may change the inclination of the normal line of the first reflection region and the inclination of the normal line of the second reflection region. The first angle adjusting unit may synchronize the normal line of the first reflection region and that of the second reflection region, and may align the directions of the normal lines of the first and second reflection regions to be parallel.

The number of sawteeth of the first and second gears may be set to M and N, respectively (herein, M and N are natural numbers), so that the movement speed of the reflector may be adjusted according to the rotation speed of the first driving unit.

The first driving unit may rotate in a first direction or a second direction, the first gear connected to the first driving unit may rotate in the first direction or the second direction, the second gear engaged with the first gear may rotate in the first direction or the second direction within the range of a first gear angle set by the controller, and the reflector connected to the second gear may move within the range of a predetermined second gear angle.

The second gear may include a hole shaped like an arc, and a stopper installed in the frame of the optical transceiver may be formed to cross the arc-shaped hole.

The optical transceiver may include an elastic body which is connected to the first gear or the second gear and which is installed in the frame of the optical transceiver, and the elastic body may be relaxed or contracted to decrease the backlash between the first and second gears.

The optical transceiver may further include a second angle adjusting unit, in which the second angle adjusting unit may include: a rotating body, to which the first angle adjusting unit is attached, which rotates; a second driving unit connected to the rotating body to drive rotation thereof; and a rotating body connecting unit configured to connect the base and the rotating body of the optical transceiver.

The rotating body connecting unit may comprise a data communication unit which is wirelessly connected with the rotating body, is located inside the rotating body and transmits data, and a second light blocking member may be installed in the data communication unit so that data wirelessly transmitted from the data communication unit does not interfere with the light of the light transmitter or of the light receiver.

The rotating body connecting unit may comprise a power transfer unit which wirelessly transfers power using a first coil and a second coil inside the rotating body, and the first coil, connected to the base of the optical transceiver, and the second coil, connected to the rotating body, may be isolated from the metal part by a third light blocking member.

The first angle adjusting unit may comprise a location sensor installed in the frame of the optical transceiver, and the location sensor may transceive light with a location indicator attached to the reflector and detect whether the reflector is located at a predetermined location in a state where the second gear is rotated.

The location sensor may include a first location sensor and a second location sensor installed in the frame of the optical transceiver, and the location indicator may include a first location indicator and a second location indicator installed in the reflector.

The first location sensor may transceive light with the first location indicator, and detect whether the reflector is located at a predetermined first location in a state where the second gear is rotated in the first direction.

The second location sensor may transceive light with the second location indicator, and detect whether the reflector is located at a predetermined second location in a state where the second gear is rotated in the second direction.

When the optical transceiver is changed from a scan mode to a correction mode, the optical transceiver may measure a first location of the reflector based on the first location indicator by rotating the reflector in the first direction, and the controller may store a first reference location of the first driving unit corresponding to the first location.

When the optical transceiver is changed from a scan mode to a correction mode, the optical transceiver may measure a second location of the reflector based on the second location indicator by rotating the reflector in the second direction, and the controller may store a second reference location of the first driving unit corresponding to the second location.

The controller may correct the first reference location and the second reference location.

A fourth light blocking member may be installed in the location sensor so that the light transceived by the location sensor does not interfere with the light of the optical transmitter or optical receiver.

The controller may transmit a signal to the first angle adjusting unit controlling the operation thereof, or may transmit a signal to the second angle adjusting unit, controlling the operation thereof.

The controller may acquire point cloud data according to the time flow in a scan mode, and may set a region of interest for acquisition of the point cloud data by adjusting the movement range of the first angle adjusting unit.

The scannable region may be determined according to the range of a first angle of the reflector included in the first angle adjusting unit and the range of a second angle of the rotating body included in the second angle adjusting unit.

The controller may set a region of interest corresponding to a part of the scannable region by adjusting the range of the first angle.

The controller may change the first angle of the reflector included in the first angle adjusting unit.

The controller may set the scan mode to (i) a normal scan mode, (ii) a concentrated scan mode, (iii) a skip scan mode, (iv) a progressive scan mode, (v) an interlaced scan mode, or a combination thereof, and may adjust the density and/or path of the point cloud data acquired by the optical transceiver.

In the normal scan mode, the optical transceiver may acquire the point cloud data by performing line-scanning at every reference angle interval.

In the concentrated scan mode, the optical transceiver may acquire the point cloud data at every interval for an angle interval narrower than the reference angle interval.

In the skip scan mode, the optical transceiver may acquire the point cloud data at every interval for an angle interval wider than the reference angle interval, or by skipping a specific angle range.

In the progressive scan mode, the optical transceiver may acquire the point cloud data by sequentially line-scanning a plurality of lines.

In the progressive scan mode, when N lines (N is a natural number) are scanned in the region of interest, the direction of the first angle of movement of the reflector may be maintained by sequentially increasing a line from the first line to the last line.

In the interlaced scan mode, the optical transceiver may acquire the point cloud data by scanning an intermediate line between the scanned lines.

In the interlaced scan mode, when N lines (N is a natural number) are scanned in the region of interest, the optical transceiver includes a section in which the direction of the first angle of movement of the reflector is switched by scanning the $K^{th}$ line that is before the $N^{th}$ line, scanning the $L^{th}$ line that is after the $K^{th}$ line, and scanning the $M^{th}$ line that is before the $L^{th}$ line, and may be operated in a scheme of intermittently skipping a line and scanning a line which has not been scanned to fill the line.

In the interlaced scan mode, the controller may set a line which is to be line-scanned by the optical transceiver in the region of interest to B×P+Q, where P may be a line scan interval at t, B may be a positive sign or a negative sign, and Q may be a line that is line-scanned at t−1, P may include a value set to be larger or smaller than the interval at which the line scanning is performed at t−1 under a predetermined condition, and B may be changed from a positive sign to a negative sign or from a negative sign to a positive sign at specific t under a predetermined condition.

Another exemplary embodiment of the present invention provides a device for measuring a distance, the device comprising: an optical transceiver configured to emit light to the target object in response to a start control signal, receive light reflected from the target object, and convert the received light into an electric signal; and a distance measuring unit configured to convert the electric signal to generate a stop control signal, and calculate a time of flight based on the time difference between the start control signal and the stop control signal to measure a distance. Here, the optical transceiver comprises: a first angle adjusting unit having a first reflection region and a second reflection region; an optical transmitter configured to transmit light to the first reflection region of the first angle adjusting unit; an optical receiver configured to receive light from the second reflection region of the first angle adjusting unit; a first light blocking member configured to separate the movement path of the transmitted light and the movement path of the received light; and a controller configured to transmit a signal controlling to the first angle adjusting unit, controlling the operation thereof. Here, the first angle adjusting unit comprises: a reflector having the first reflection region and the second reflection region; a first driving unit configured to transfer power to the reflector; a first gear connected to the first driving unit; and a second gear connected to the reflector, which moves while being engaged with the first gear.

Another exemplary embodiment of the present invention provides a moving object comprising: a distance measuring device configured to calculate the time of flight between the moving object and a target object and measure the distance to the target object; and a moving device configured to move the moving object based on the distance to the target object, in which the distance measuring device comprises: an optical transceiver configured to emit light to the target object in response to a start control signal, receive light reflected from the target object, and convert the received light into an electric signal; and a distance measuring unit configured to convert the electric signal to generate a stop control signal, and calculate the time of flight based on the time difference between the start control signal and the stop control signal to measure a distance. Here, the optical transceiver comprises: a first angle adjusting unit having a first reflection region and a second reflection region; an optical transmitter configured to transmit light to the first reflection region of the first angle adjusting unit; an optical receiver configured to receive light from the second reflection region of the first angle adjusting unit; a first light blocking member configured to separate the movement path of the transmitted light and the movement path of the received light; and a controller configured to transmit a signal to the first angle adjusting unit controlling the movement thereof, where the first angle adjusting unit comprises: a reflector having the first reflection region and the second reflection region; a first driving unit configured to transfer power to the reflector; a first gear connected to the first driving unit; and a second gear connected to the reflector, which moves while being engaged with the first gear.

Another exemplary embodiment of the present invention provides a device for measuring a distance, comprising: an optical transceiver configured to emit light to the target object in response to a start control signal, receive light reflected from the target object, and convert the received light into an electric signal; and a distance measuring unit configured to convert the electric signal to generate a stop control signal, and calculate the time of flight based on the time difference between the start control signal and the stop control signal to measure a distance. Here, the optical transceiver comprises: a first angle adjusting unit which has a first reflection region and a second reflection region and which moves in a first direction or a second direction; an optical transmitter configured to transmit light to the first reflection region of the first angle adjusting unit; an optical receiver configured to receive light from the second reflection region of the first angle adjusting unit; a first light blocking member configured to separate the movement paths of the transmitted light and the received light; a second angle adjusting unit configured to move the first angle adjusting unit in a third direction or a fourth direction; and a controller configured to transmit a signal controlling the operation of the first angle adjusting unit or the second angle adjusting unit to the respective units thereof, where the controller acquires point cloud data according to time flow in a scan mode, and sets a region of interest for acquisition of the point cloud data by adjusting the movement range of the first angle adjusting unit.

Another exemplary embodiment of the present invention provides an optical transceiver comprising: a first angle adjusting unit which has a first reflection region and a second reflection region and which moves in a first direction or a second direction; an optical transmitter configured to transmit light to the first reflection region of the first angle adjusting unit; an optical receiver configured to receive light from the second reflection region of the first angle adjusting unit; a first light blocking member configured to separate the movement paths of the transmitted light and the received light; a second angle adjusting unit configured to move the first angle adjusting unit in a third direction or a fourth direction; and a controller configured to transmit a signal controlling the operation of the first angle adjusting unit or the second angle adjusting unit to the respective units thereof, where the controller acquires point cloud data according to time flow in a scan mode, and sets a region of interest for acquisition of the point cloud data by adjusting the movement range of the first angle adjusting unit.

Another exemplary embodiment of the present invention provides a moving object comprising: a distance measuring device configured to calculate the time of flight between the moving object and a target object to measure the distance to the target object; and a moving device configured to move the moving object based on the distance to the target object. Here, the distance measuring device comprises: an optical transceiver configured to emit light to the target object in response to a start control signal, receive light reflected from the target object, and convert the received light into an electric signal; and a distance measuring unit configured to convert the electric signal to generate a stop control signal, and calculate the time of flight based on a time difference between the start control signal and the stop control signal to measure the distance. Here, the optical transceiver comprises: a first angle adjusting unit having a first reflection region and a second reflection region and moving in a first direction or a second direction; an optical transmitter configured to transmit light to the first reflection region of the first angle adjusting unit; an optical receiver configured to receive light from the second reflection region of the first angle adjusting unit; a first light blocking member configured to separate the movement paths of the transmitted light and the received light; a second angle adjusting unit configured to move the first angle adjusting unit in a third direction or a fourth direction; and a controller configured to transmit a signal controlling the operation of the first angle adjusting unit or the second angle adjusting unit to the respective unit thereof, where the controller acquires point cloud data according to time flow in a scan mode and sets a region of interest for acquisition of the point cloud data by adjusting the movement range of the first angle adjusting unit.

As described above, according to the exemplary embodiments of the present invention, it is possible to remove light scattering and minimize the size of a 3D scanning LIDAR sensor by separating the transmitter module and the receiver module; disposing a transmitter, a mirror, and a receiver in a specific space so that the light emitted from a light source or that reflected from a transmission mirror is reflected from a first reflection region of a moving mirror and is then moved to a target object, after which the light reflected from the target object is reflected from a second reflection region of the moving mirror and is moved to the transmission mirror or a photodiode; installing a blocking wall separating movement paths of the light; and restricting the range of movement of the moving mirror connected to a second gear that is engaged with a first gear connected to a motor in order to drive movement.

According to the exemplary embodiments of the present invention, it is possible to remove light scattering and set a region of interest for the acquisition of point cloud data by a LIDAR sensor which is capable of performing 3D scanning, which is achieved by separating a transmitter module and a receiver module; disposing a transmitter, a mirror, and a receiver in a specific space so that light emitted from a light source or light reflected from a transmission mirror is reflected from a first reflection region of a moving mirror and is then moved to a target object, after which light reflected from the target object is reflected from a second reflection region of the moving mirror and is moved to the transmission mirror or a photodiode; installing a blocking wall separating the movement paths of the light; and restricting the range of movement of the moving mirror.

Although not explicitly stated herein, all effects which may be expected by the technical characteristics of the present invention and the provisional effects thereof are covered under the scope of the present invention.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the figures or drawings.

DETAILED DESCRIPTION

Hereinafter, in the description of the present invention, as known functions combined herein are obvious to those skilled in the art, a detailed description of such known functions will be omitted to avoid making the subject matter of the present invention unclear, and some exemplary embodiments of the present invention will be described in detail with reference to the illustrative drawings.

A Light Detection and Ranging (LIDAR) sensor according to the present exemplary embodiment may be applied to a distance measuring device or a moving object. That is, the LIDAR sensor may be applied to a product requiring the measurement of a distance, such as in a small home appliance, or in a moving object, such as a drone or a vehicle. A LIDAR sensor is a device which shoots a laser signal, measures the return time of a reflected light signal, and then measures the distance of the reflector using the speed of light. The laser signal is changed to an electric signal through a photodiode. The laser signal may have a predetermined wavelength band. The LIDAR sensor may also be called an optical transceiver.

Figure 1:
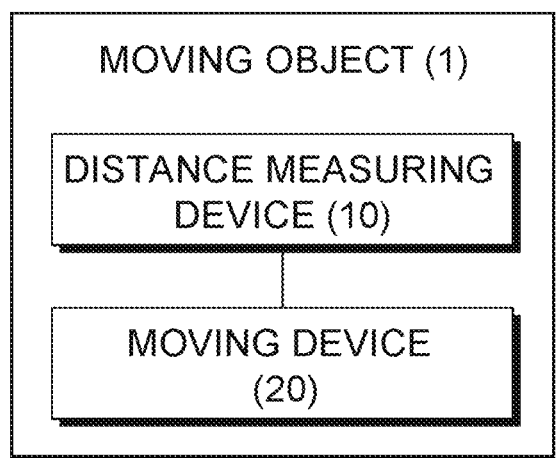
FIG. 1 is a block diagram illustrating an example of a moving object according to an exemplary embodiment of the present invention.

FIG. 1 is a block diagram illustrating an example of a moving object according to an exemplary embodiment of the present invention.

As illustrated in FIG. 1, a moving object 1 includes a distance measuring device 10 and a moving device 20. In the moving object 1, some of the various constituent elements illustrated in FIG. 1 may be omitted, or other constituent elements may be additionally included. For example, the moving object may additionally include a cleaning unit.

The moving object 1 means a device designed to be movable from a specific location to another location according to a predefined scheme, which may move from a specific location to another location using a means of movement such as a wheel, a rail, a leg for walking, a wing, or a multirotor. The moving object 1 may collect external information using a sensor, and the like, and then move according to the collected information, or may move using a separate means of manipulation controlled by a user. Examples of the moving object 1 may include a robot vacuum cleaner, a toy car, and a moving robot employable for industrial or military purposes.

A robot vacuum cleaner is a device which sucks foreign substances, such as dust, piled on a floor while travelling through a space to be cleaned, automatically cleaning the space. Unlike a general vacuum cleaner that is moved by an external force applied by a user, the robot vacuum cleaner cleans a space to be cleaned while moving using external information or a predefined movement pattern.

The robot vacuum cleaner may move automatically according to a predefined pattern, may move in accordance to external obstacles detected through a detection sensor, and may move according to a signal transmitted from a remote control device manipulated by a user.

The detection sensor may be implemented as a LIDAR. LIDAR is a device which shoots a laser signal, measures the return time and intensity of the reflected laser signal, and then measures the distance of a reflector using the speed of light. The laser signal is changed to an electric signal through a photodiode. The laser signal may have a predetermined wavelength band.

Figure 2:
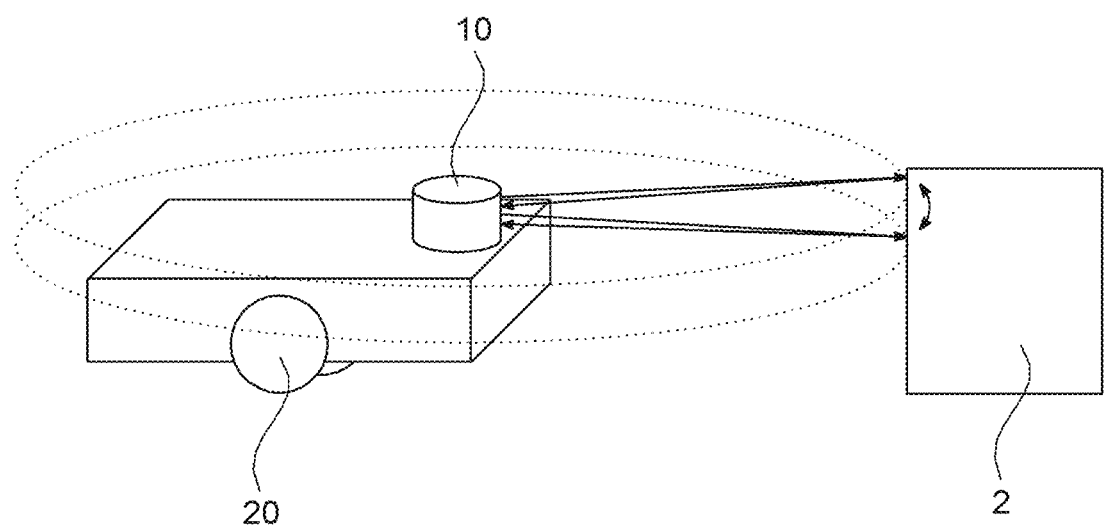
FIG. 2 is a diagram illustrating an example of a moving object according to an exemplary embodiment of the present invention.

FIG. 2 is a diagram illustrating an example of the moving object according to an exemplary embodiment of the present invention.

Referring to FIG. 2, the distance measuring device 10, measuring the distance to a target object by calculating the time of flight between a moving object and the target object, is located at an upper end portion of a main body, but this is simply an example, and the present invention is not limited thereto. Further, one or more distance measuring devices may be implemented at appropriate locations according to the design to be implemented.

The distance measuring device 10 transceives light using a pair of light sources and a photodiode, and performs a 3D scan of a surrounding area using a movable mirror and a rotating body.

The distance measuring device 10 may operate by a Time of Flight (TOF) scheme. The TOF scheme is a scheme in which a laser emits a pulse or a square wave signal, and the arrival time of a reflection pulse or square wave signals reflected from the objects located within a measurement range to a receiver is measured and used to calculate the distance between a measurement target and the distance measuring device.

The moving device 20 moves a moving object by calculating a travelling path based on the distance to a target object or by detecting an obstacle. The moving device may move a moving object based on a relative location of an artificial mark.

Hereinafter, a distance measuring device which is implemented in a moving object or is independently operated will be described with reference to FIG. 3.

Figure 3:
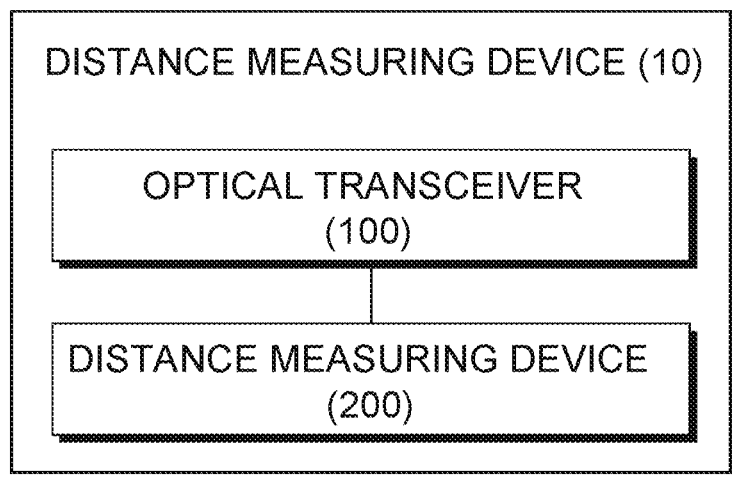
FIG. 3 is a block diagram illustrating an example of a distance measuring device according to another exemplary embodiment of the present invention.

FIG. 3 is a block diagram illustrating an example of the distance measuring device. As illustrated in FIG. 3, the distance measuring device 10 includes an optical transceiver 100 and a distance measuring unit 200. In the distance measuring device 10, some of the various constituent elements illustrated in FIG. 3 may be omitted or other constituent elements may be additionally included. For example, the distance measuring device 10 may additionally include an interface.

The optical transceiver 100 transmits a laser signal and receives a reflected signal. The optical transceiver 100 emits light to a target object in response to a start control signal, receives light reflected from the target object and then converts the received light into an electric signal. The optical transceiver 100 outputs the electric signal for a predetermined detection time.

The optical transceiver 100 converts light into a current or a voltage, and requires a circuit for buffering and scaling the output of a photodiode. For example, a Trans Impedance Amplifier (TIA) may be connected to the photodiode. The TIA amplifies the current of the photodiode, converts the amplified current into a voltage, and outputs the voltage. TIAs may be divided into Resistive Feedback TIAs (R-TIA) and Capacitive Feedback TIAs (C-TIA).

The optical transceiver 100 may include a signal converter. The signal converter may be connected to the photodiode of the optical transceiver 100, and the TIA may be connected to the signal converter.

A light source emits light to a target object based on a predetermined sampling period. The sampling period may be set by a controller of the distance measuring device 10. The sampling period is the time for which the optical transceiver 100 emits light according to a start control signal, receives the reflected light, and converts the light into an electric signal. The optical transceiver 100 may repeatedly perform the operations in a subsequent sampling period.

The photodiode receives the light reflected from the target object and converts the light into an electric signal. The photodiode may be implemented as a PN junction photodiode, a PIN photodiode, an Avalanche Photo Diode (APD), and the like. The photodiode outputs an electric signal until an optical carrier fades. Further, as the size of an output signal is increased, the time taken for the signal to fade is also increased.

The signal converter outputs the electric signal for a detection time in the sampling period so as not to be limited by the fading time of the output signal. The signal converter may include a resistor, a switch, and a capacitor.

The resistor is connected to the photodiode. One end of the resistor is connected to the photodiode, while the other end is connected to a ground. The resistor may be connected to the anode or cathode of the photodiode.

When a resistance value is small, a waveform has a value which is not 0 for a similar time to the time during which light passes through the photodiode, but there is a problem in that the size of the output signal is small. Accordingly, it is necessary to amplify the size of the electric signal using a resistor having a larger value than a value predetermined for the resistor. In this case, a dragging phenomenon of the signal is generated.

In order to solve the signal dragging phenomenon, the transmission path of the electric signal is changed to pass through a switch. The optical transceiver 100 may output a signal, in which part of a region in which the size of the electric signal is decreased is removed. Even though the end of the electric signal is removed, the distance measuring device 10 may measure a distance. The reason is that a signal determiner does not detect the end point of the electric signal, but instead detects a start time point and a time point of a maximum size of the electric signal to output a rising edge and a falling edge.

The switch is connected to the resistor in parallel and changes the transmission path of the electric signal. For example, the switch may be implemented as a transistor and the like.

The switch transmits (i) an electric signal for a detection time ($T_d$) in the sampling period ($T_s$) through a first path and (ii) an electric signal for an interruption time ($T_a$) in the sampling period ($T_s$) through a second path. The first path is a path in which the signal is transmitted through a capacitor, and the second path is a path in which the signal is transmitted to the group through the switch.

Even though the signal fading times (T1, T2, and T3) of the electric signal output from the photodiode 140 are taken with the dragging phenomenon, the distance measuring device 10 may process the signal according to the sampling period without a need to stand by until the signal fades.

The distance measuring device 10 adjusts the sampling period, calculates and sets an appropriate detection time according to the sampling period, and controls an on/off operation of the switch 152. The controller of the distance measuring device 10 may control the on/off operation of the switch with reference to a sampling period, a detection time, an interruption time, the waveform of an emitted light, the interval between the on and off time of the light source, the pulse width of the start control signal, the pulse width of a stop control signal, the rotation speed of the optical transceiver, the signal processing and standby time of the signal determiner and a time calculator, and the like.

The capacitor is connected to a point connected with the photodiode and the resistor and outputs an electric signal. The capacitor serves to remove the DC component of the electric signal. A non-inverting amplifier circuit may be connected to an end of the capacitor.

The distance measuring unit 200 may comprise one or more signal determiners which convert an electric signal, measure an accurate time point, and output a stop control signal.

The distance measuring unit 200 uses the signal determiner to convert the electric signal so that the signal point having a maximum signal size has a predetermined size, adjusts the size of the converted electric signal, and detects a time point at which the electric signal has the predetermined size. The signal determiner converts the electric signal and generates a stop control signal.

The signal determiner receives the electric signal from the photodiode or the TIA. The received electric signal, that is, the input signal, has the form of a rising and falling signal in response to the reflected light. The signal determiner accurately measures a target time point for the input signal and outputs an electric signal.

The input signal has a front time point ($T_{front}$), target time points ($T_1$ and $T_2$) at which a time point meets a predetermined threshold value, and a peak time point ($T_{max}$) according to the form of the input signal. The signal determiner performs a two-stage conversion processes to detect the time point closest to the front time point ($T_{front}$) and the peak time point ($T_{max}$). The converted signal has a front time point ($T_{front}$), rising time points ($T_{rising1}$ and $T_{rising2}$) at which the time points meet a predetermined threshold value, falling time points ($T_{falling1}$ and $T_{falling2}$) at which the time points meet a predetermined threshold value, and an end time point ($T_{end}$). The end time point ($T_{end}$) is the same time point as the peak time point ($T_{max}$) of the signal before the conversion.

The signal determiner differentiates the input signal, or converts the input signal using a Constant Fraction Discriminator (CFD). The CFD is a scheme of finding the time point at which a time point when a delayed signal of an original signal is identical to a signal for which the size is adjusted by a predetermined size ratio is also the time point at which the signal has a predetermined ratio with a maximum size.

The signal determiner measures accurate time points in the rising and falling electric signal and outputs a signal. The signal determiner converts the electric signal, detects a time point at which the electric signal has a predetermined reference size, and generates a stop control signal. When an inclination of the input signal is converted so that a signal point having the maximum signal size has a predetermined size, the rising time points ($T_{rising1}$ and $T_{rising2}$) become close to the front time point ($T_{front}$), and the falling time points ($T_{falling1}$ and $T_{falling2}$) become close to the end time point ($T_{end}$).

The signal determiner adjusts the size of the converted input signal. The signal determiner amplifies the size of the converted input signal N degrees (N is a natural number), and converts the inclination of the signal to be close to vertical through a plurality of amplification processes. Because the inclination is large, it is possible to accurately obtain the time point even when a circuit is simply implemented with a comparator.

The signal determiner converts the input signal so that the signal point having the maximum signal size in the input signal has a predetermined size. For example, the signal determiner converts the input signal so that the size of the signal is zero. The distance measuring unit 200 may detect a time point close to the time point at which the input signal has the maximum size by converting the time point at which the input signal has the maximum size to zero and comparing the size of the signal with a threshold value.

The signal determiner detects at least one time point having a predetermined reference size from the input signal of which the size is adjusted and then outputs signals. Herein, the output signal may have two types. For example, the distance measuring unit 200 may output a rising edge and a falling edge.

The distance measuring unit 200 measures a time and a distance by the TOF scheme, and calculates the time of flight based on the time difference between the start control signal and the stop control signal to measure a distance. The distance measuring unit 200 calculates the distance from the time using the speed of light.

The distance measuring unit 200 may include one or more time digital converters which convert the difference between two times into a digital value. The input signal of the time digital converter may have a pulse form of the same signal source, or may also be an edge of another signal source. For example, the distance measuring device 10 may calculate a time difference based on the rising edge or falling edge of the start control signal and the rising or the falling edge of the stop control signal.

The time digital converter may be formed of a time delay element and a flip flop. The time delay element may be implemented with a digital element using an inverter or an analog element using a current source. The time digital converter may adopt various schemes, such as a phase deviation scheme, a scheme using a high-resolution clock, and an equivalent time sampling scheme.

The time digital converter measures a time by using (i) the numbers ($N_1$ and $N_2$) counted by a coarse counter and a fine counter and (ii) a large clock signal of the coarse counter and a small clock signal of the fine counter. The resolution of the time digital converter is determined by the time difference between the large clock signal of the coarse counter and the small clock signal of the fine counter.

The time digital converter comprises a slow oscillator generating a large clock signal and a fast oscillator generating a small clock signal. A phase detector detects the time point at which the large clock signal is synchronized with the small clock signal.

In existing time digital converters, the slow oscillator and the fast oscillator adjust the number of buffers to adjust the clock widths. Existing time digital converters have a resolution of about 80 picoseconds (ps) due to the signal delay time of the buffer itself.

In the time digital converter, the slow oscillator and the fast oscillator adjust the clock widths by changing the positions and the signal paths of gates on the circuit. For example, the slow oscillator and the fast oscillator may be combined with the same gates. The slow oscillator and the fast oscillator of the time digital converter according to the present exemplary embodiment change the positions and the signal paths of the gates so that the time digital converter has resolution of about 10 picoseconds (ps).

The time digital converter processes the rising edge and the falling edge together, so that the slow oscillator or the fast oscillator may be shared and designed.

The interface is a communication path transceiving information with another device (or a host). Another device may access the distance measuring device 10 through the interface and set a parameter. The distance measuring device 10 may transmit the measured time and distance to another device through the interface.

When the distance measuring device 10 adopts a differential scheme implemented with an RC circuit in the process of converting the inclination of the signal, the frequency characteristic of the signal corresponding to the change in a distance is altered, resulting in the generation of a time error. When the CFD scheme is applied in the process of converting the inclination of the signal, the inclination of the signal is different, resulting in a difference in the charging time of a capacitor of the comparator and a change in the response time of the comparator, thereby generating a time error. Accordingly, the distance measuring device 10 performs a process of correcting the time error.

The distance measuring unit 200 corrects the FOT using the pulse width of the stop control signal. Since the output signal of a general photodiode has a large change in pulse width, when the pulse width and a work error are one-to-N matched and a region is not close, there is a problem in that it is difficult to use the output signal. In the present exemplary embodiment, the process of converting the signal is performed so that the relationship between pulse width and work error may be modeled simply.

The distance measuring unit 200 models a function between the work error and pulse width, and measures a correction factor in advance. The distance measuring unit 200 corrects the TOF by applying the correction factor, which is inversely proportional to the pulse width. That is, when a reflected signal is weak, the pulse width is decreased, resulting in an increase in the work error, and the distance measuring unit 200 therefore sets the correction factor to be large. When the reflected signal is strong, the pulse width is increased, resulting in a decrease of the work error, so the distance measuring unit 200 sets the correction factor to be small.

The distance measuring unit 200 calculates the pulse width based on the rising edge or the falling edge of the stop control signal, and adds the factor value derived from the function of the work error to the pulse width to the TOF before the correction. The distance measuring device 10 corrects the TOF using the pulse width of the reflected signal, thereby accurately calculating the TOF.

In order to decrease the size of the LIDAR sensor, all of the components, for example, the transmitter, the mirror, and the receiver, need to be closely integrated. In order to decrease the size of the optical transceiver, the distance from an emitter and the receiver to the mirror needs to be minimized.

Figure 4:
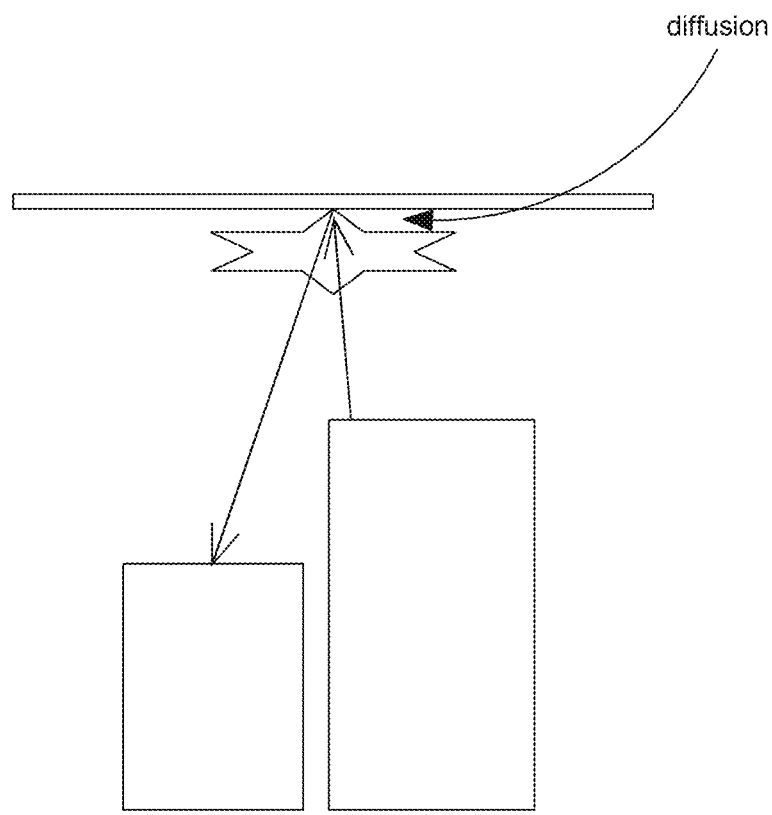
FIG. 4 is a diagram illustrating an example of an echo phenomenon according to a disposition of an optical transmitter, a mirror, and an optical receiver.

FIG. 4 is a diagram illustrating an example of an echo phenomenon according to a disposition of the optical transmitter, the mirror, and the optical receiver. Referring to FIG. 4, when both the optical transmitter and the optical receiver are located at a lower end and the mirror is located at an upper end, during the process of miniaturizing the components an echo problem arises due to the locations of the components and the optical path. The echo is generated from the diffused or scattered light signal emitted from the mirror. When the laser signal meets the mirror, a weakly diffused or reflected signal becomes input to the photodiode. The rising edge is delayed due to this weak signal, and the falling edge varies according to the distance to an actual target object.

In order to miniaturize the LIDAR sensor, the distance between the transceiver and the mirror needs to be minimized. In order to secure a vertical field of view, the mirror moves, and in this case, it is necessary to secure a space in which the mirror may moves while also interrupting the echo signal. In order to solve this limitation, in the present exemplary embodiment, a blocking wall is installed.

Hereinafter, a structure of the optical transceiver which is capable of performing 3D scanning will be described with reference to FIGS. 5 to 25.

Figure 5:
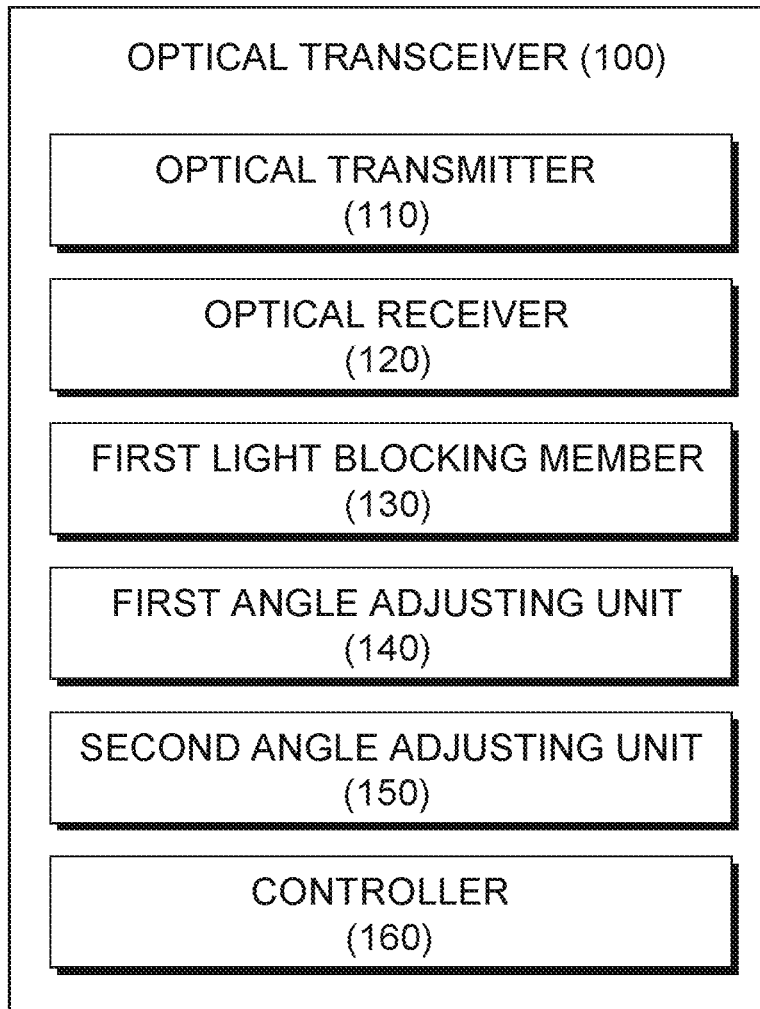
FIG. 5 is a block diagram illustrating an example of an optical transceiver according to other exemplary embodiments of the present invention.
Figure 6:
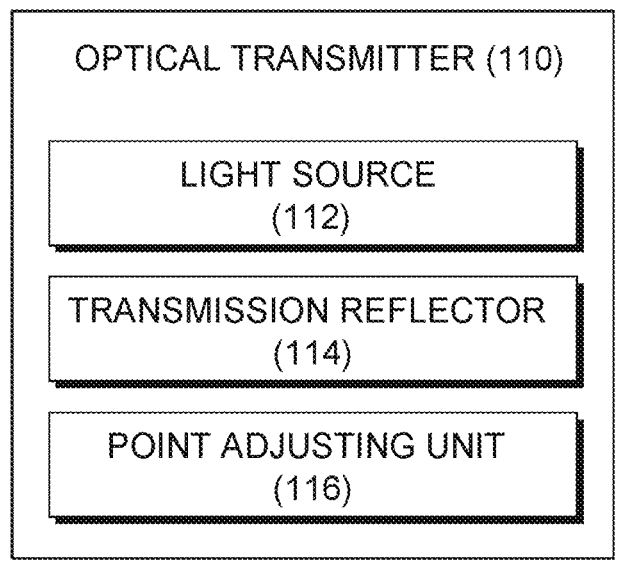
FIG. 6 is a block diagram illustrating an example of an optical transmitter of the optical transceiver according to other exemplary embodiments of the present invention.
Figure 7:
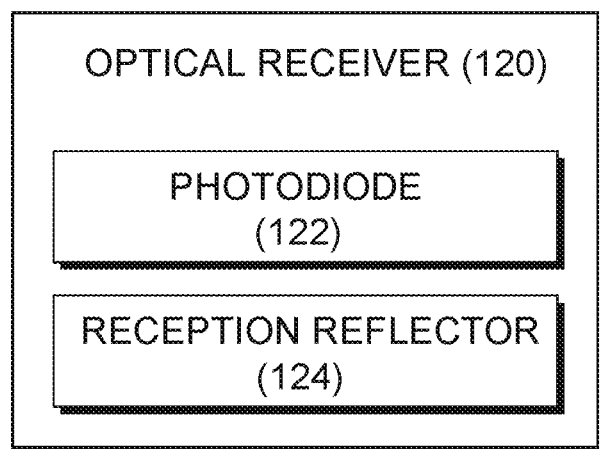
FIG. 7 is a block diagram illustrating an example of an optical receiver of the optical transceiver according to other exemplary embodiments of the present invention.
Figure 8:
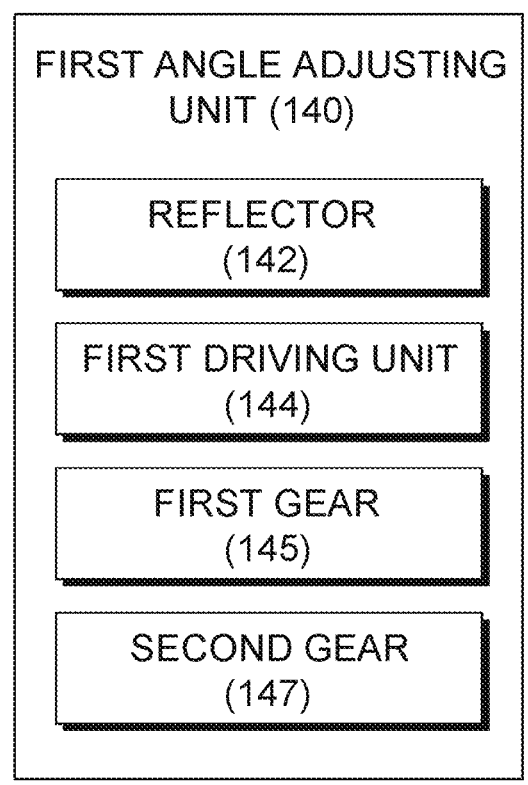
FIG. 8 is a block diagram illustrating an example of a first angle adjusting unit of the optical transceiver according to other exemplary embodiments of the present invention.

Referring to FIG. 5, the optical transceiver 100 comprises an optical transmitter 110, an optical receiver 120, a first light blocking member 130, a first angle adjusting unit 140, a second angle adjusting unit 150, and a controller 160. In the optical transceiver 100, some of the various constituent elements illustrated in FIG. 5 may be omitted or other constituent elements may be additionally included. Referring to FIG. 6, the optical transmitter 110 may include a light source 112 and a transmission reflector 114. Referring to FIG. 7, the optical receiver 120 may include a photodiode 122 and a reception reflector 124. Referring to FIG. 8, the first angle adjusting unit 140 may include a reflector 142, a first driving unit 144, a first gear 145, and a second gear 147.

Figure 9:
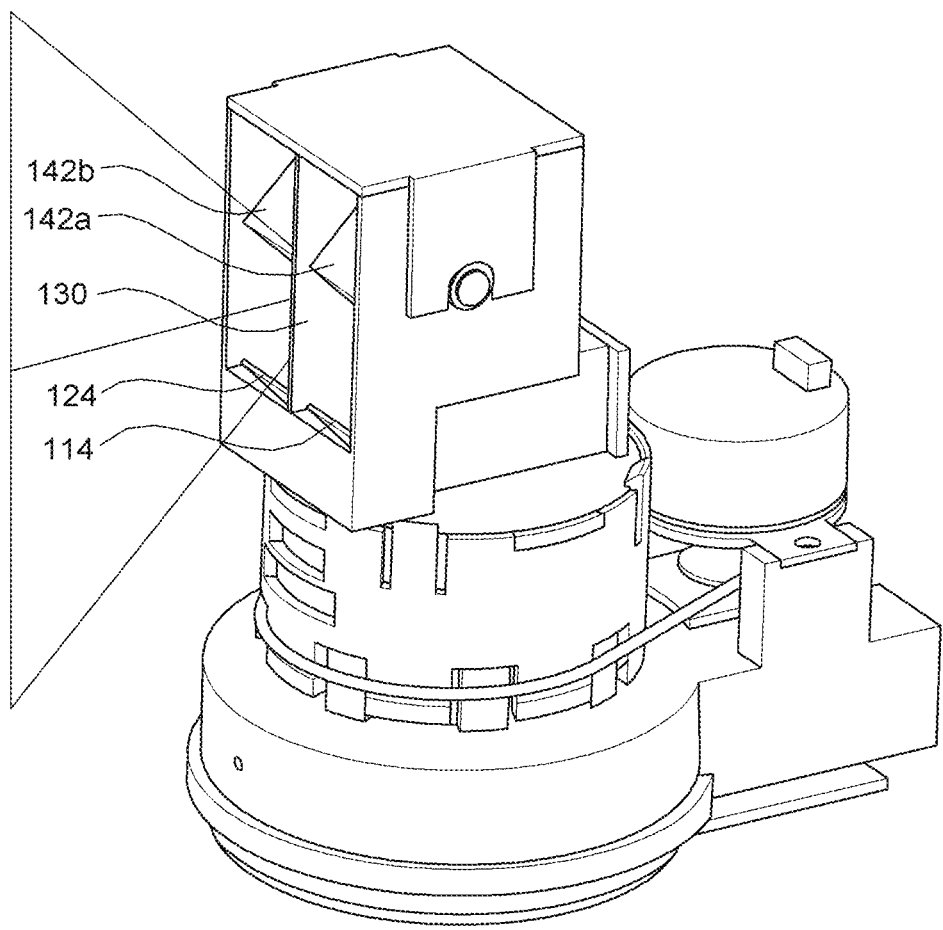
FIGS. 9 to 11 are diagrams illustrating examples of the optical transceiver according to other exemplary embodiments of the present invention.
Figure 10:
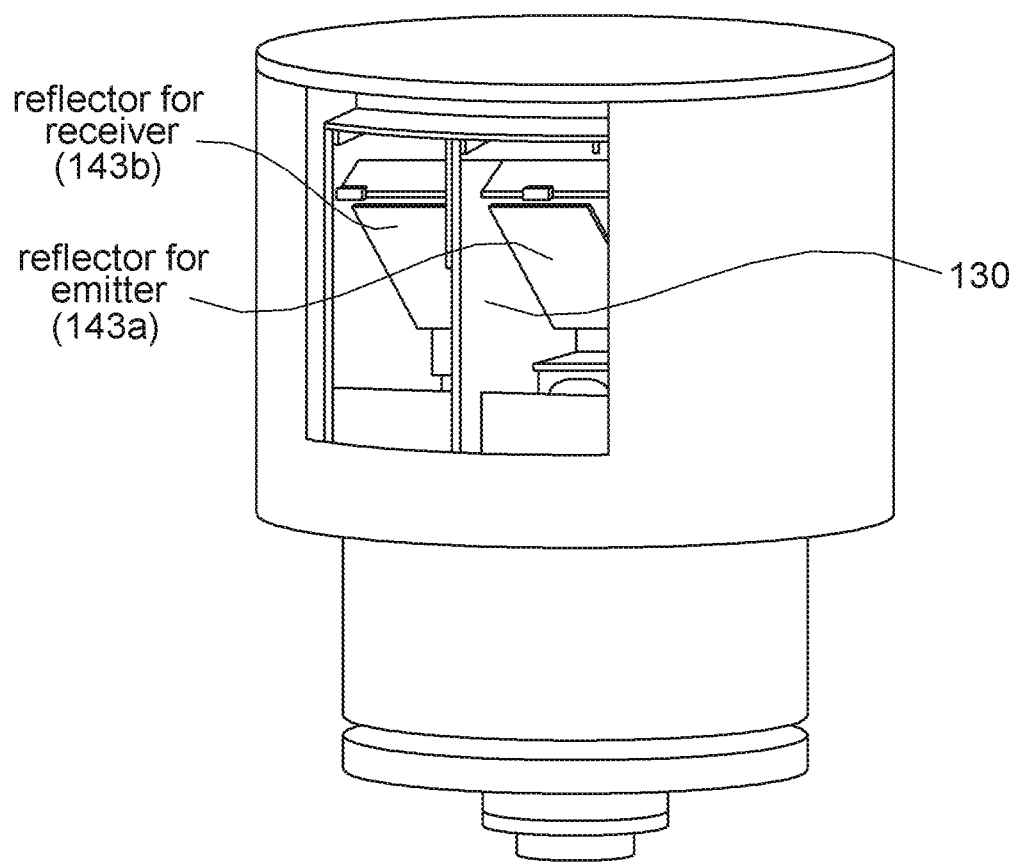
Figure 11:
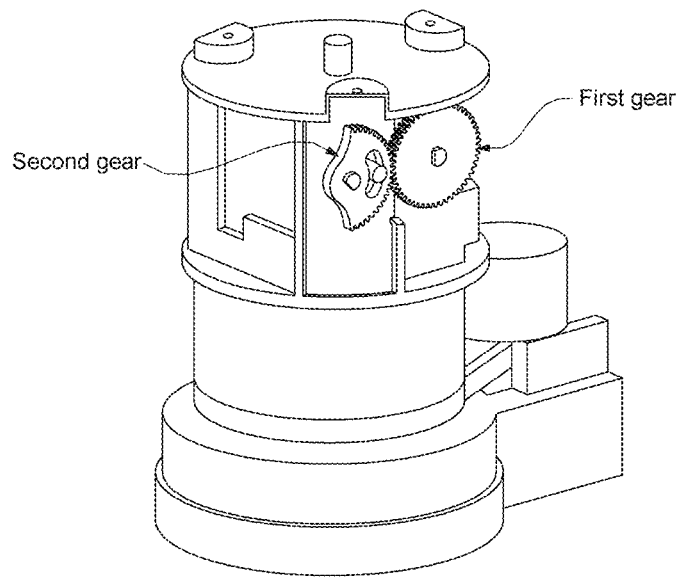

FIGS. 9 to 11 are diagrams illustrating an example of the optical transceiver.

The optical transmitter 110 transmits light to a first reflection region 143a of the first angle adjusting unit 140. The optical receiver 120 receives light from a second reflection region 143b of the first angle adjusting unit 140. The first light blocking member 130 separates the movement path of the transmitted light from the movement path of the received light. The first angle adjusting unit 140 comprises the first reflection region 143a and the second reflection region 143b, reflects light, and may be installed to be fixed or movable.

The light source 112 is a device which emits light, and transmits the light to the first reflection region 143a, the transmission reflector 114, and the like. The light source 112 may be implemented as a Laser Diode (LD) and the like, and may generate a laser pulse signal in the unit of nanoseconds. The laser signal may have a predetermined wavelength band. The light source 112 may be connected with a point adjusting unit which adjusts the emission speed of the light source based on a predetermined sampling period and adjusts the number of elements of point cloud data acquired per unit time. The point adjusting unit may be implemented using the controller 160. For example, the point adjusting unit may set the emission speed of the light source 112 so as to acquire 10 K or 200 K points per second.

The photodiode 122 is a device which receives light reflected from the second reflection region 143b, the reception reflector 124, and the like, and then converts the received light into an electric signal. The principle in which when light of photon energy hits a diode, electrons are transferred and positive charges and holes are generated so that the electrons act may be applied to the photodiode 140. The photodiode 140 may be implemented as a PN junction photodiode, a PIN photodiode, an Avalanche Photo Diode (APD), and the like.

The transmission reflector 114, the reception reflector 124, and the reflector 142 may be implemented as a mirror. Lenses 113 and 123 may be located between the movement paths of light. The optical transceiver 100 may divide or collect light using the lens and the like, or may form parallel light paths. The optical transceiver 100 may comprise a transmission optical unit and a reception optical unit. The transmission optical unit and the reception optical unit are paths of the laser signal, and may be formed in a tube structure.

The reflector 142 includes the first reflection region 143a and the second reflection region 143b. The first reflection region 143a reflects the light transmitted by the optical transmitter 10 to a target object. The second reflection region 143b reflects the light reflected from the target object to the optical receiver 120. Even though a part of the light transmitted by the optical transmitter 110 may be diffused, scattered, or reflected from the first reflection region 143a, the first light blocking member 130 blocks the path through which the diffused, scattered, or reflected light may travel to the optical receiver 143b.

The controller 160 transmits a signal controlling operation of the first angle adjusting unit 140, or transmits a signal controlling operation of the second angle adjusting unit 150. As a numerical values set by the controller 160 for controlling each constituent element of the optical transceiver 100, appropriate numerical values may be used according to the design to be implemented.

Figure 12:
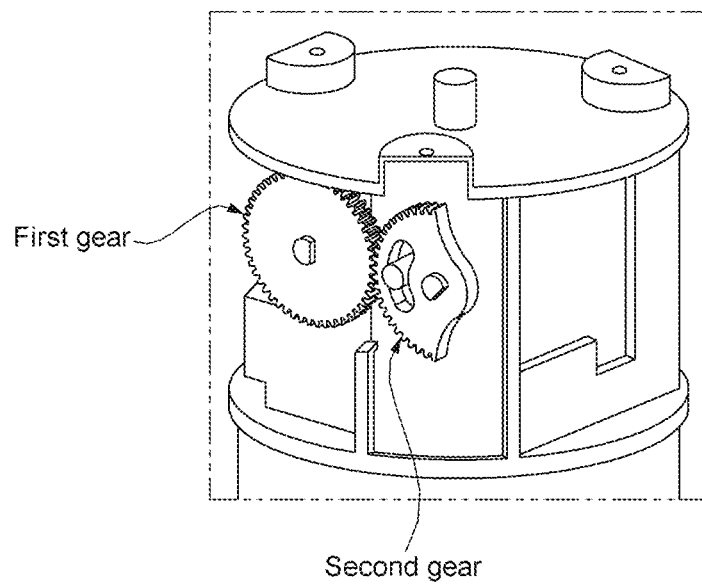
FIGS. 12 to 14 are diagrams illustrating examples of the first angle adjusting unit of the optical transceiver according to other exemplary embodiments of the present invention.
Figure 13:
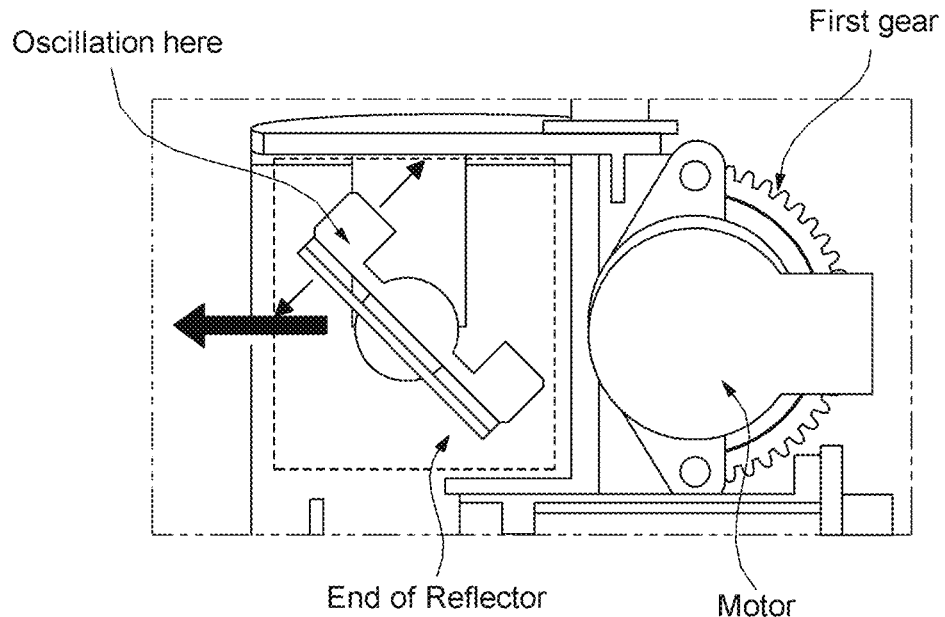
Figure 14:
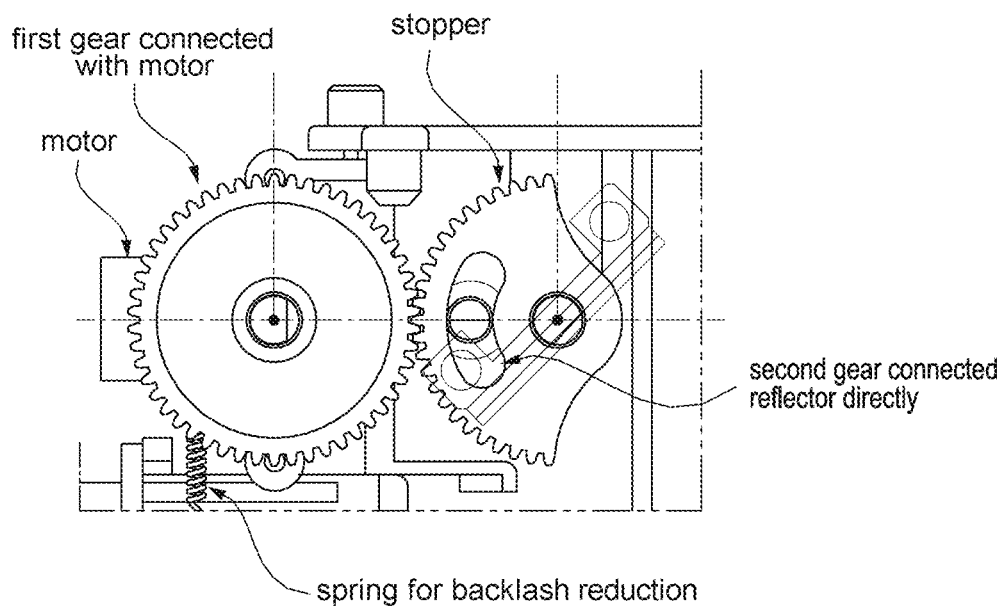
Figure 15:
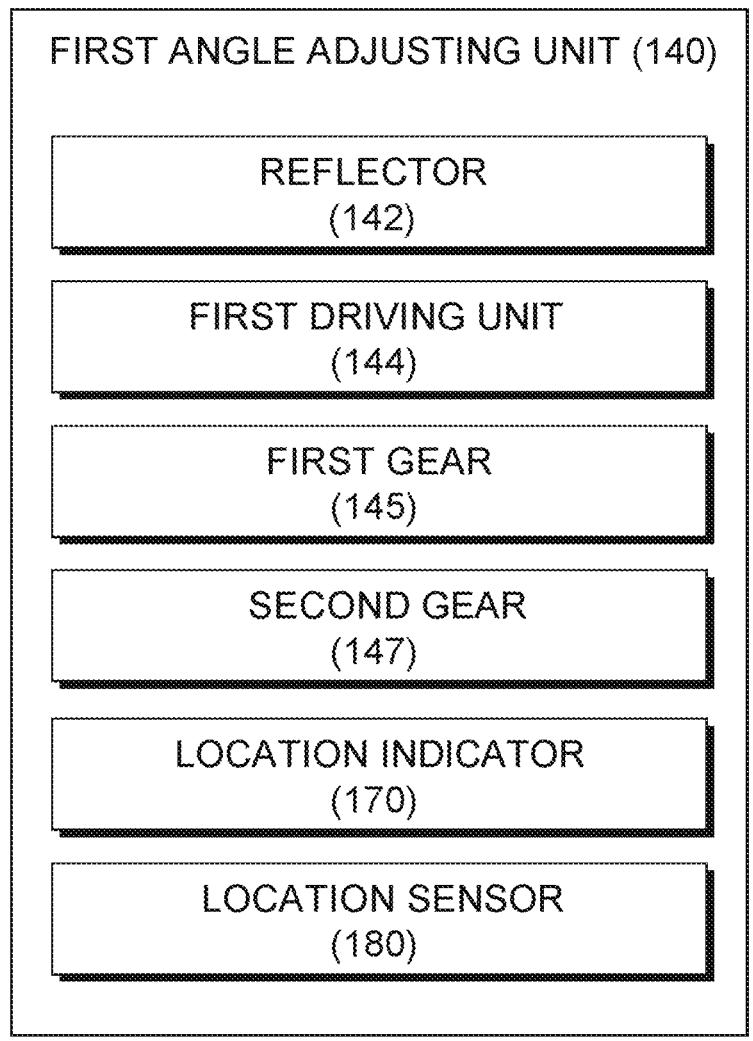
FIG. 15 is a block diagram illustrating an example of the first angle adjusting unit of the optical transceiver according to another exemplary embodiment of the present invention.
Figure 16:
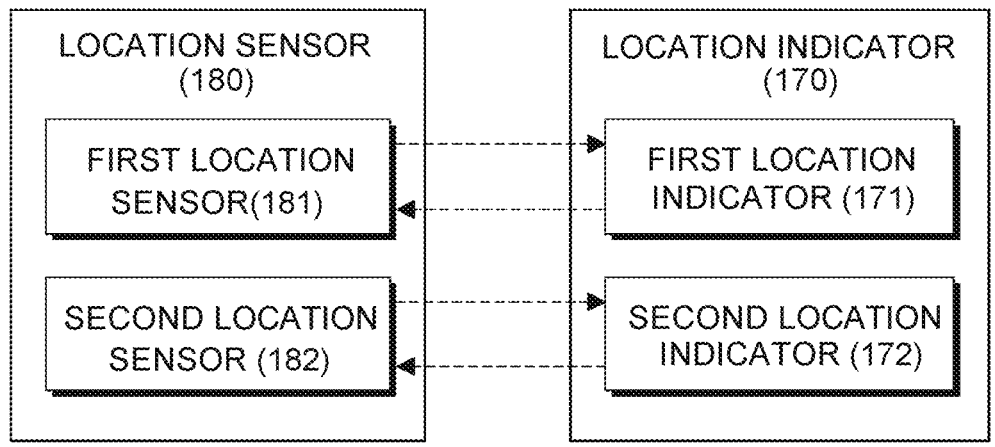
FIG. 16 is a block diagram illustrating an example of a location sensor and a location indicator of the optical transceiver according to another exemplary embodiment of the present invention.

FIGS. 12 to 14 are diagrams illustrating an example of the first angle adjusting unit of the optical transceiver.

The first angle adjusting unit 140 includes the reflector 142 in which the first reflection region 143a and the second reflection region 143b are spatially divided by the first light blocking member 130. The reflector 142 includes a first reflector 142a having the first reflection region 143a and a second reflector 142b having the second reflection region 143b. The first reflector 142a and the second reflector 142b are located in a first space and a second space, respectively, which are separated by the first light blocking member 130.

In the present exemplary embodiment, the transmission path and the reception path of the light are completely isolated from each other by the first light blocking member 130. That is, a transmitter module and a receiver module are located inside a specific space divided by the first light blocking member 130. Each of the transmitter module and the receiver module may include a mirror. The echo phenomenon is removed through employment of the first light blocking member, thereby increasing the output of the light source.

The controller 160 changes the inclinations of a normal line of the first reflection region and a normal line of the second reflection region, and synchronizes the changes in inclination of the normal lines of the first and second reflection regions. The controller 160 adjusts the directions of the normal lines of the first and second reflection regions to be parallel.

The first angle adjusting unit 140 comprises the first driving unit 144 which transfers power to the reflector 142 of the first angle adjusting unit 140. The first driving unit 144 may be implemented as a general motor, a step motor, and the like. The first driving unit 144 may adjust the rotation direction, rotation speed, or rotation acceleration, and rotates in a first direction or a second direction. The first or second direction may mean an upper or lower direction according to a vertical field of view.

The first angle adjusting unit 140 comprises the first gear 145 connected to the first driving unit 144, and a second gear 147 which moves while being engaged with the first gear 145. The second gear 147 is connected to the reflector 142.

The first driving unit 144 rotates in the first or second direction within the range of a first gear angle set by the controller 160. The first gear 145 connected to the first driving unit 144 rotates in the first or second direction. The second gear 147, engaged with the first gear 145, also rotates in the first or second direction. The reflector 142 connected to the second gear 147 moves within the range of a predetermined second gear angle.

The range of the first gear angle and the range of the second gear angle are determined according to the saw tooth ratios of the first gear 145 and the second gear 147. The number of saw teeth of the first gear 145 and the number of saw teeth of the second gear 147 are set to M and N (herein, M and N are natural numbers), so that the movement speed of the reflector 142 is adjusted according to the rotation speed of the first driving unit 144.

The ranges of the second gear angles of the second gear 147 and the reflector 142 are limited, thereby decreasing the height of the LIDAR sensor. Particularly, it is possible to minimize the volume of the reflector by increasing the space disposition efficiency according to the range of the second gear angle. A part of the second gear may be removed according to the range of the second gear angle in which the second gear moves. The shape of the saw tooth portion of the second gear that is not engaged with the first gear may be minimized. That is, the second gear may have a fan shape in which the saw teeth are disposed in the arc portion of the gear.

Referring to FIG. 14, the second gear 147 may include a hole shaped like an arc. A stopper installed in the frame of the optical transceiver crosses the arc-shaped hole to mechanically restrict the movement of the second gear 147. The movement of the second gear is detected using a location sensor, and the controller adjusts the rotation of the motor, thereby preventing the stopper and the hole from colliding with each other.

The first angle adjusting unit 140 may include an elastic body. The elastic body is connected to the first gear or the second gear, and is installed in the frame of the optical transceiver. The elastic body is relaxed or contracted to decrease backlash between the first and second gears. As the elastic body, a torsion spring, a coil spring, and the like may be used.

Referring to FIGS. 15 to 19, the first angle adjusting unit 140 may include a location sensor 180 installed in the frame of the optical transceiver. The location sensor 180 transceives light with a location indicator 170 attached to the reflector 142 and detects whether the reflector 142 is located at a predetermined location in the state where the second gear 147 rotates.

The location sensor 180 includes a first location sensor 181 and a second location sensor 182 installed in the frame of the optical transceiver. The location indicator 170 includes a first location indicator 171 and a second location indicator 172 installed in the reflector 142. The location indicator 170 may be attached to a lateral surface of the reflector and implemented using a material which reflects light. The first location indicator 171 and the second location indicator 172 are located at the same distance from a rotation shaft of the second gear.

The first location sensor 181 transceives light with the first location indicator 171 and detects whether the reflector 142 is located at a predetermined first location in the state where the second gear 147 rotates in a first direction. The first location may be a location in the state where the reflector 142 is maximally rotated in an upper direction.

During the rotation of the second gear within a limited angle range, the movement path of the light transmitted by the first location sensor and the movement path along which the first location indicator moves cross once, while the movement path of the light transmitted by the first location sensor and the movement path along which the second location indicator moves do not cross. The first location sensor receives the light reflected by the second location indicator to prevent the first location from being confused.

The second location sensor 182 transceives light with the second location indicator 172 and detects whether the reflector 142 is located at a predetermined second location in the state where the second gear 147 rotates in a second direction. The second location may be a location in the state where the reflector 142 is maximally rotated in a lower direction.

During the rotation of the second gear within a limited angle range, the movement path of the light transmitted by the second location sensor and the movement path along which the second location indicator moves cross once, while the movement path of the light transmitted by the second location sensor and the movement path along which the first location indicator moves do not cross. The second location sensor receives the light reflected by the first location indicator to prevent the second location from being confused.

Figure 17:
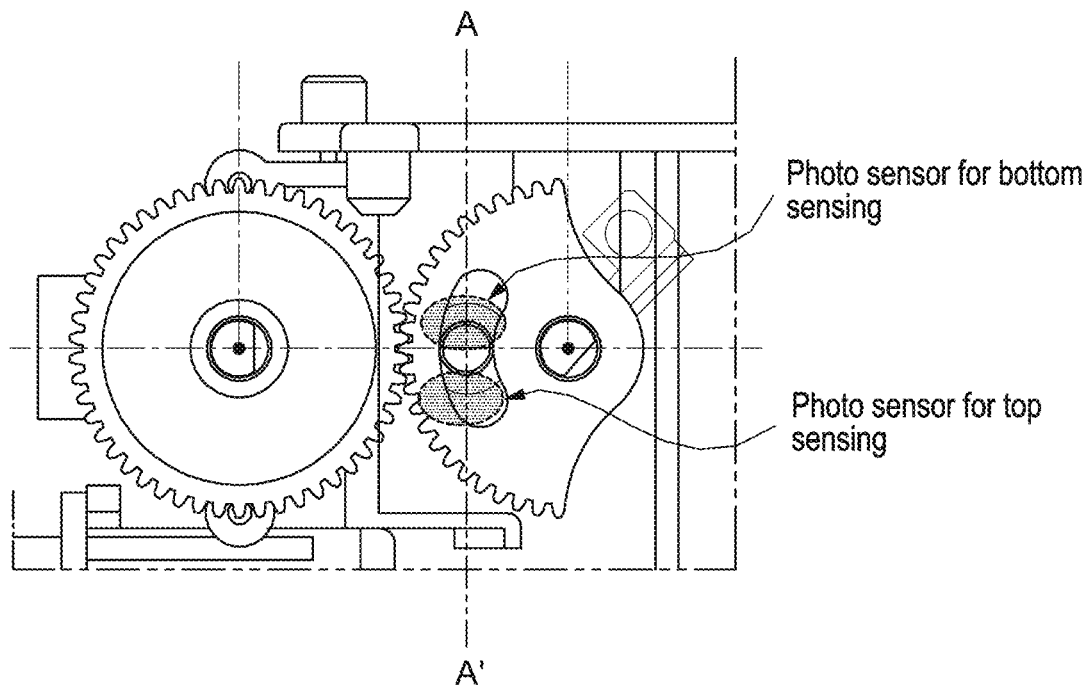
FIGS. 17 to 19 are diagrams illustrating examples of the location sensor and the location indicator of the optical transceiver according to other exemplary embodiments of the present invention.
Figure 18:
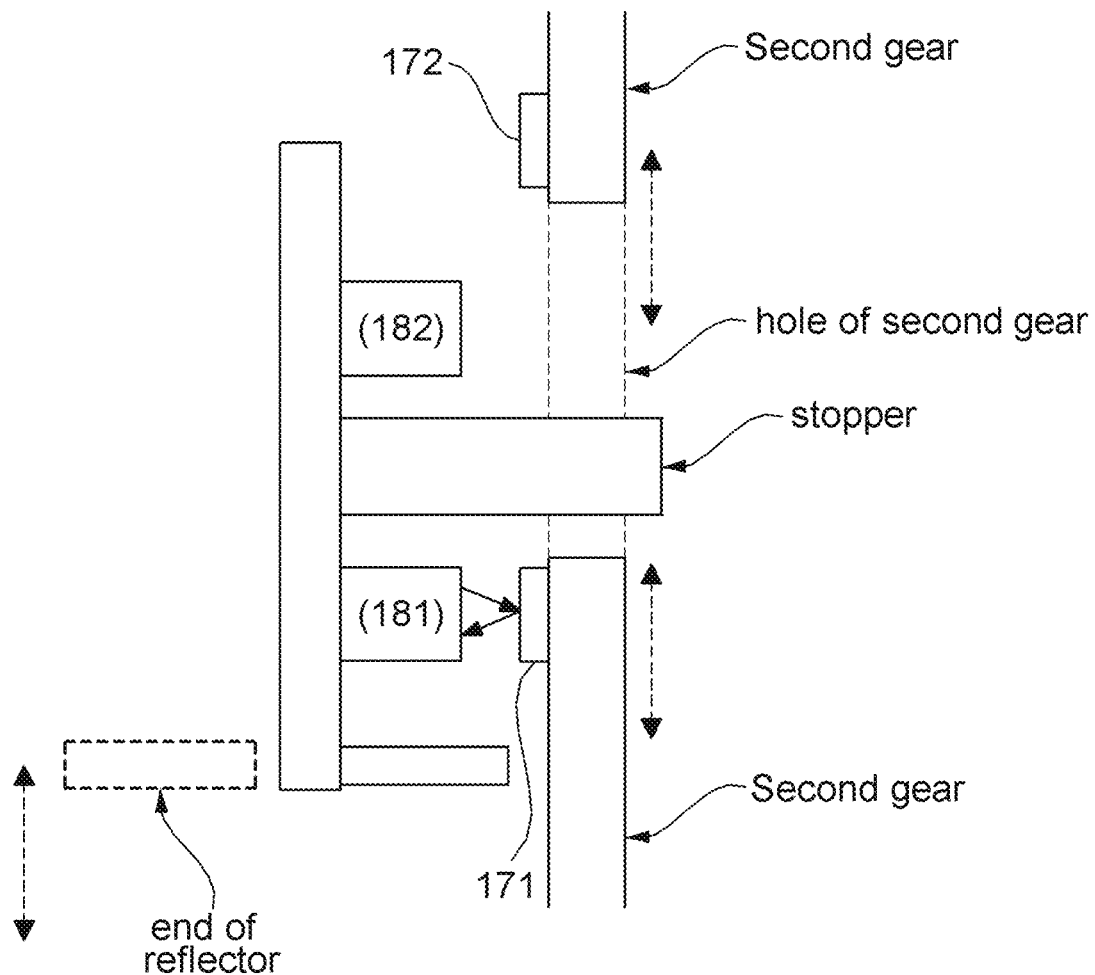
Figure 19:
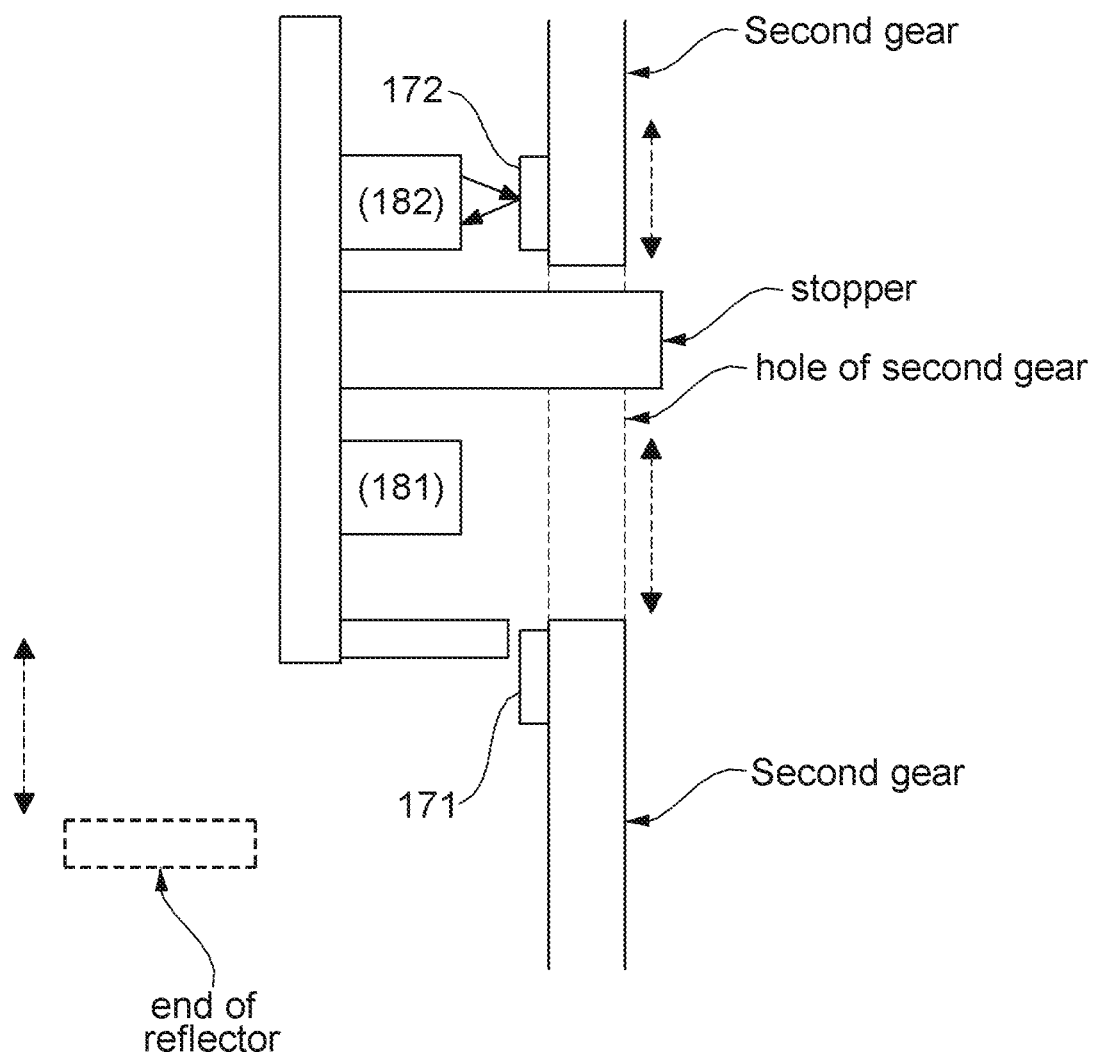

FIGS. 18 and 19 are diagrams illustrating cross-sections taken along line A-A' of FIG. 17.

When the first location indicator 171 installed at a lower end of the hole of the second gear 147 is located parallel to the first location sensor 181 while the second gear 147 continuously rotates in the first direction, the first location sensor 181 transmits a first control signal to the controller 160. When the second gear 147 rotates in the first direction, the reflector 142 connected to the second gear 147 also moves in the first direction.

When the second location indicator 172 installed at an upper end of the hole of the second gear 147 is located parallel to the second location sensor 182 while the second gear 147 continuously rotates in the second direction, the second location sensor 182 transmits a second control signal to the controller 160. When the second gear 147 rotates in the second direction, the reflector 142 connected to the second gear 147 also moves in the second direction.

The controller 160 stores the rotation angle of the first driving unit 144 corresponding to the location of the reflector 142 at a time point of the reception of the first control signal from the first location sensor 181. The controller 160 also stores the rotation angle of the first driving unit 144 corresponding to the location of the reflector 142 at a time point of the reception of the second control signal from the second location sensor 182.

A fourth light blocking member may be installed in the location sensor 180 so that the light transceived by the location sensor 180 does not interfere with the light of the optical transmitter 110 or the light of the optical receiving receiver 120. The fourth light blocking member may be installed in a neighboring area of the location sensor 180, and may also be installed in each of the first location sensor 181 and the second location sensor 182.

The optical transceiver 100 adjusts the movement path and the angle of the light using the moving reflector 142 and secures a vertical field of view, thereby measuring a pin point, unlike existing devices implemented with a single lens and a photodiode array. The optical transceiver acquires point cloud data.

As illustrated in FIGS. 9, 14, 20, and 21, the reflector may be implemented as a rectangular mirror, and various-shaped mirrors having appropriate sizes and shapes may also be used according to an implemented design. The transmitter module and the receiver module may comprise fixed mirrors 114 and 124, respectively.

In the LIDAR sensor, the transmission path of light is formed as the first reflection region in the light transmitter, and the reception path of light is formed as the light receiver in the second reflection region. The first reflection region and the second reflection region move at predetermined angles when viewed in the same direction.

The light transmitter 110 and the light receiver 120 may comprise lens 113 and 123. When a single vision lens is used as the lens of the transmitter and the receiver, it may be difficult to completely adjust a focus. A general focal length lens and a lens tube ray may be mounted on an interface board.

Figure 20:
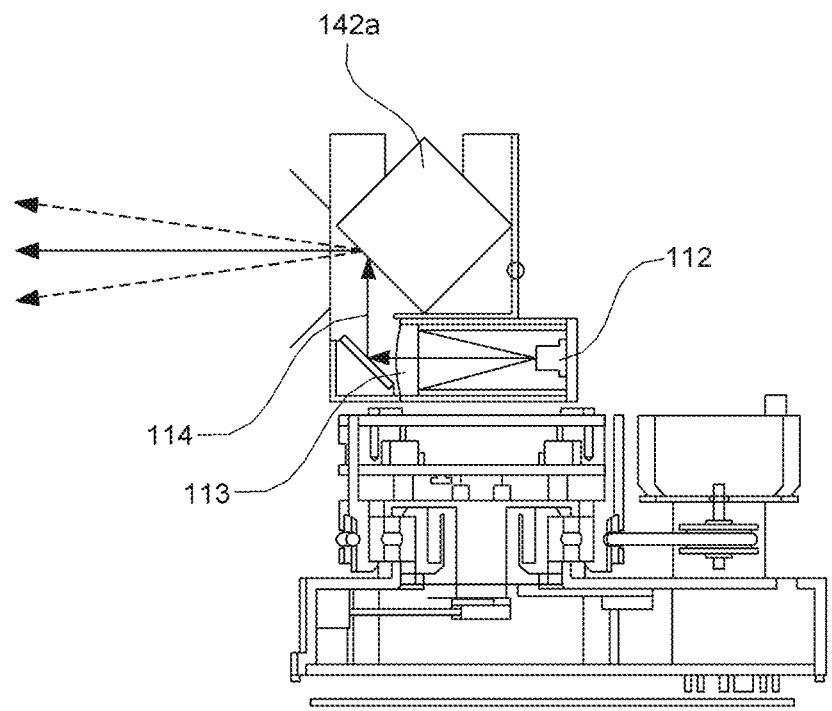
FIG. 20 is a diagram illustrating an example of a transmission path of the optical transceiver according to other exemplary embodiments of the present invention.

Referring to FIG. 20, the optical transceiver 100 may use the motor connected to the first gear to enable movement of the first reflector 142a connected to the second gear. A beam output from the transmitter is steered by the first reflector 142a.

In FIG. 20, the transmission path of light may be formed as the light source 112→the transmission lens 113→the transmission reflector 114→the first reflector 142a→the target object. The reception path of light may also be formed as the light source 112→the first reflector 142a, as necessary.

Figure 21:
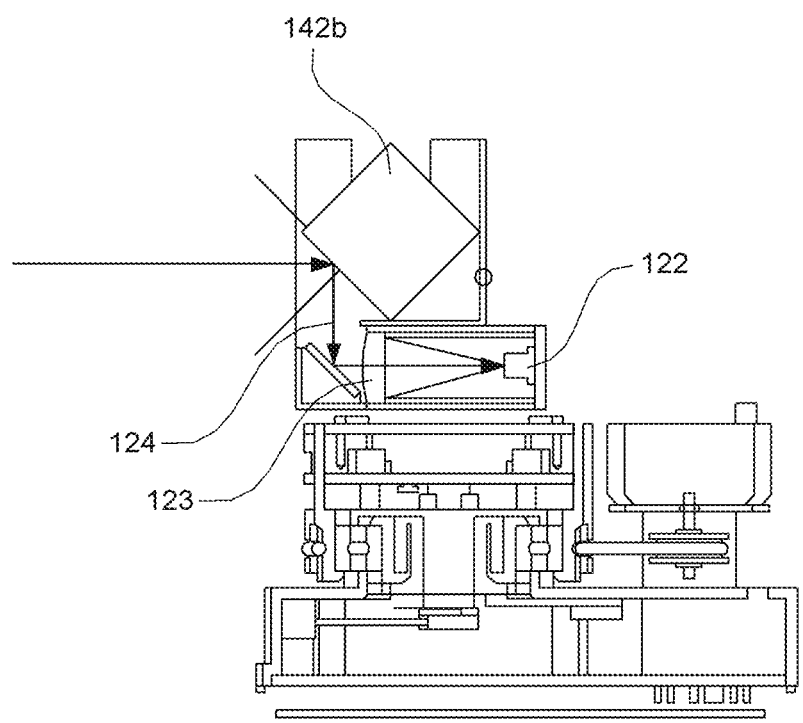
FIG. 21 is a diagram illustrating an example of a reception path of the optical transceiver according to other exemplary embodiments of the present invention.
Figure 22:
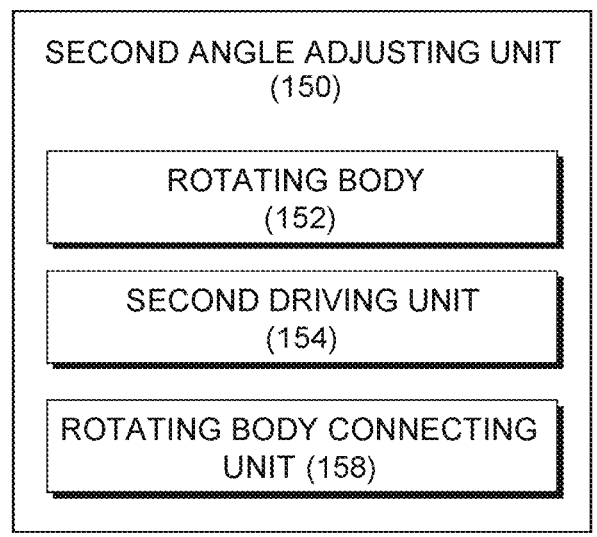
Figure 23:
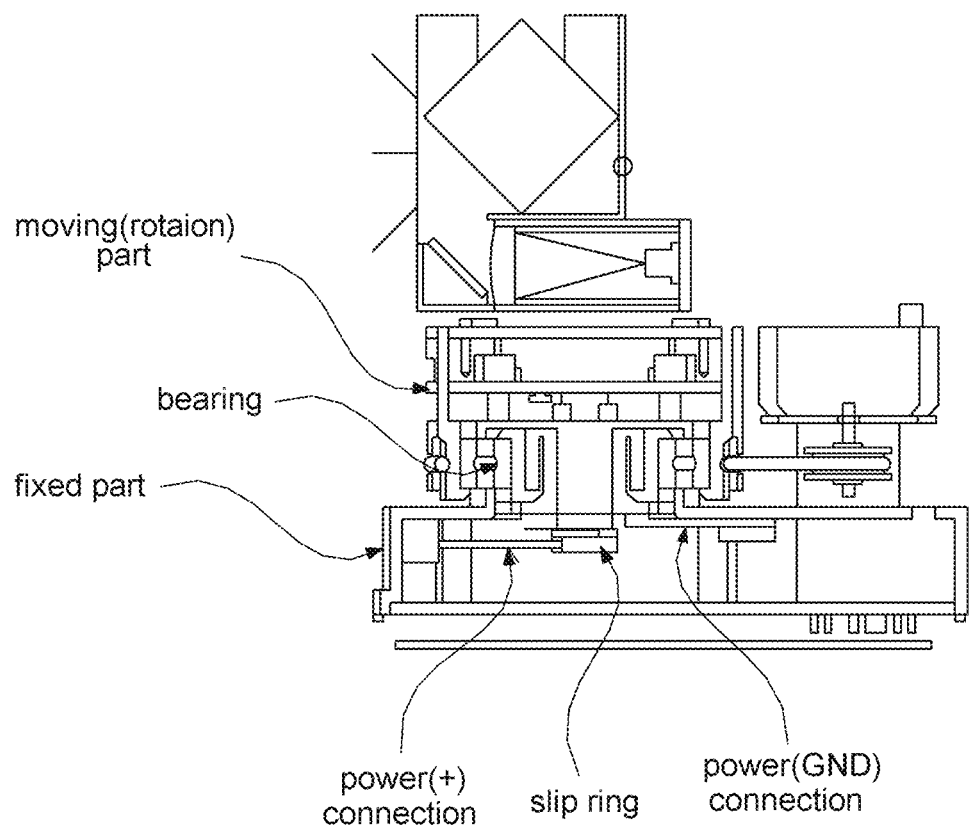
FIGS. 23 to 25 are diagrams illustrating an example of a second angle adjusting unit of the optical transceiver according to other exemplary embodiments of the present invention.
Figure 24:
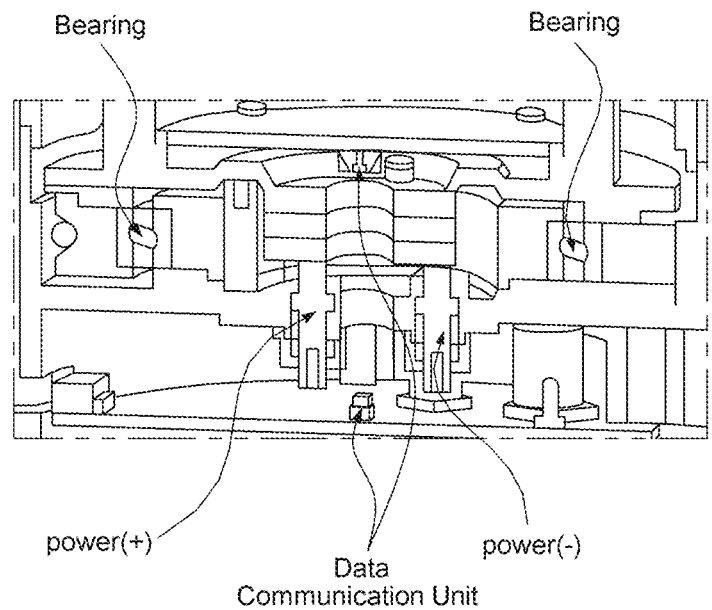
Figure 25:
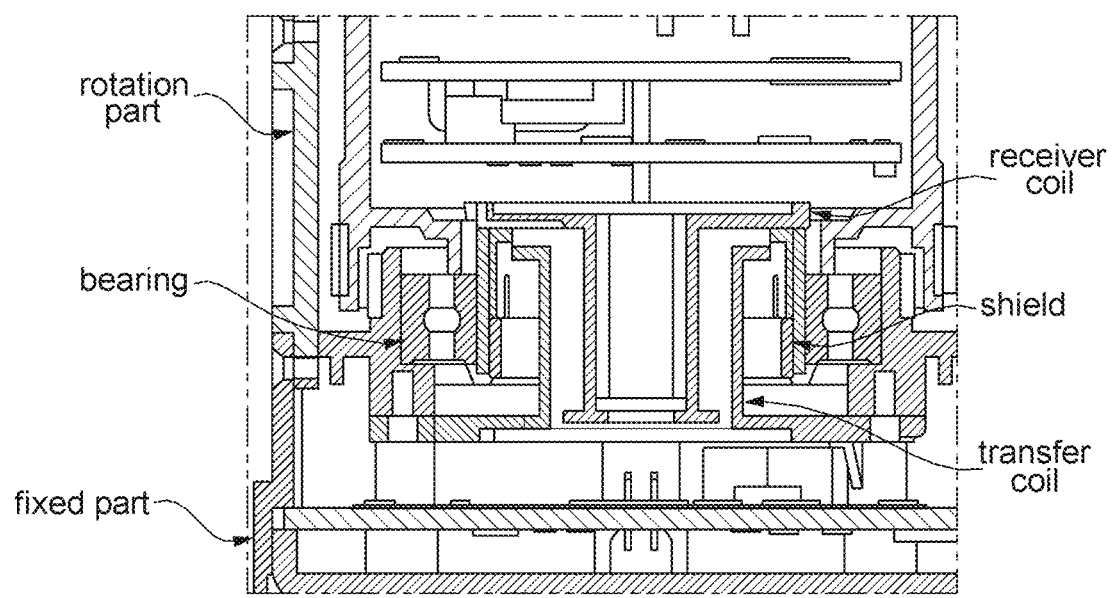

Referring to FIG. 21, the optical transceiver 100 may use the motor connected to the first gear, enabling movement of the second reflector 142b connected to the second gear. Beams received from the target object are steered by the second reflector 142b.

In FIG. 21, the reception path of light may be formed as the target object→the second reflector 142b→the reception reflector 124→the reception lens 123→the photodiode 122. The reception path of light may also be formed as the second reflector 142b→the photodiode 122, as necessary.

The first reflector 142a and the second reflector 142b are connected to the second gear and synchronized with each other to move. The first reflector and the second reflector are connected while passing through the first light blocking member or crossing over the first light blocking member, and may also be implemented integrally.

The LIDAR sensor may measure a pin point in which an error due to the echo phenomenon is minimized to minimize the volume of the LIDAR sensor.

The 3D LIDAR sensor, that is, the optical transceiver, includes the transmitter module, the receiver module, a rotating body, and a second driving unit. The transmitter module and the receiver module are connected to the rotating body. The second driving unit may transfer power to the rotating body through a cable, a chain, and the like, and may be implemented with a motor and the like. The second driving unit rotates the rotating body in a specific direction to drive rotation of the transmitter module and the receiver module.

FIGS. 22 to 25 illustrate an example of the second angle adjusting unit of the optical transceiver.

The second angle adjusting unit 150 includes a rotating body 152 which is attached to the first angle adjusting unit 140 and which rotates. The rotating body 152 is attached to the optical transmitter, the optical receiver, and the first light blocking member to facilitate rotation. The rotating body 152 may rotate by a specific angle in a third direction or a fourth direction using a bearing.

The second angle adjusting unit 150 includes a second driving unit 154 which is connected to the rotating body 152 to rotate the rotating body 152. The second driving unit 154 transfers power to the rotating body 152 of the second angle adjusting unit 150. The second driving unit 154 may be implemented as a general motor, a step motor, and the like, and may adjust the rotation direction, rotation speed, or rotation acceleration. The second driving unit 154 rotates in the third direction or the fourth direction. The third or fourth direction may mean a left or right direction according to a horizontal field of view.

The second angle adjusting unit 150 includes a rotating body connecting unit connecting a base and the rotating body 152 of the optical transceiver 100. The rotating body connecting unit transfers power into the rotating body and communicates data.

The rotating body connecting unit 158 includes a data communication unit which is wirelessly connected with the inside of the rotating body and which transmits data.

The data communication unit is vulnerable to electric noise or surge emitted from a product or radiated noise generated in diode switching, so the data communication unit is wirelessly connected. The data communication unit may adopt an infrared communication scheme in order to completely remove wires. An infrared transmitter and an infrared receiver are provided at the centers of the rotating body at the upper end and a base at the lower end, respectively, so that data may be bidirectionally transceived.

A second light blocking member may be installed in the data communication unit so that the data wirelessly transmitted in the data communication unit does not interfere with the light of the optical transmitter or the optical receiver. The second light blocking member helps prevent the laser and infrared rays from interfering with each other.

The rotating body connecting unit 158 includes a power transfer unit which transfers power wirelessly using a coil inside the rotating body. The coil includes a first coil and a second coil. The first coil may transmit power and the second coil may receive power. An opposite case is also available.

The first coil connected to the base of the optical transceiver and the second coil connected to the rotating body are isolated by a third light blocking member. The third light blocking member may be installed around a metal part, such as a bearing, and may be implemented as a ferrite shield. The transmission efficiency of the coil may be improved by the third light blocking member.

The distance measuring device adjusts the vertical scanning movement of the reflector of the first angle adjusting unit through a controller implemented as a Field Programmable Gate Array (FPGA), a processor, and the like. The controller transmits the control signal to the first driving unit to move the reflector. Each of the controllers adjusting the vertical scanning movement of the reflector and the horizontal rotating movement of the rotating body may be implemented by an independent module.

The distance measuring unit receives a vertical angle from the controller adjusting the vertical scanning movement of the reflector, and receives a horizontal angle from the controller adjusting the horizontal rotating movement, and stores the vertical and horizontal angles.

In the distance measuring device, the photodiode receives light emitted from the light source to calculate TOF. The distance measuring device transfers the vertical angle, the horizontal angle, and the TOF to a host through the interface. The TOF may be corrected or calibrated. The distance measuring device may perform filtering on at least one of the vertical angle, the horizontal angle, and the TOF to remove noise, and then transmit the data to the host.

Figure 26:
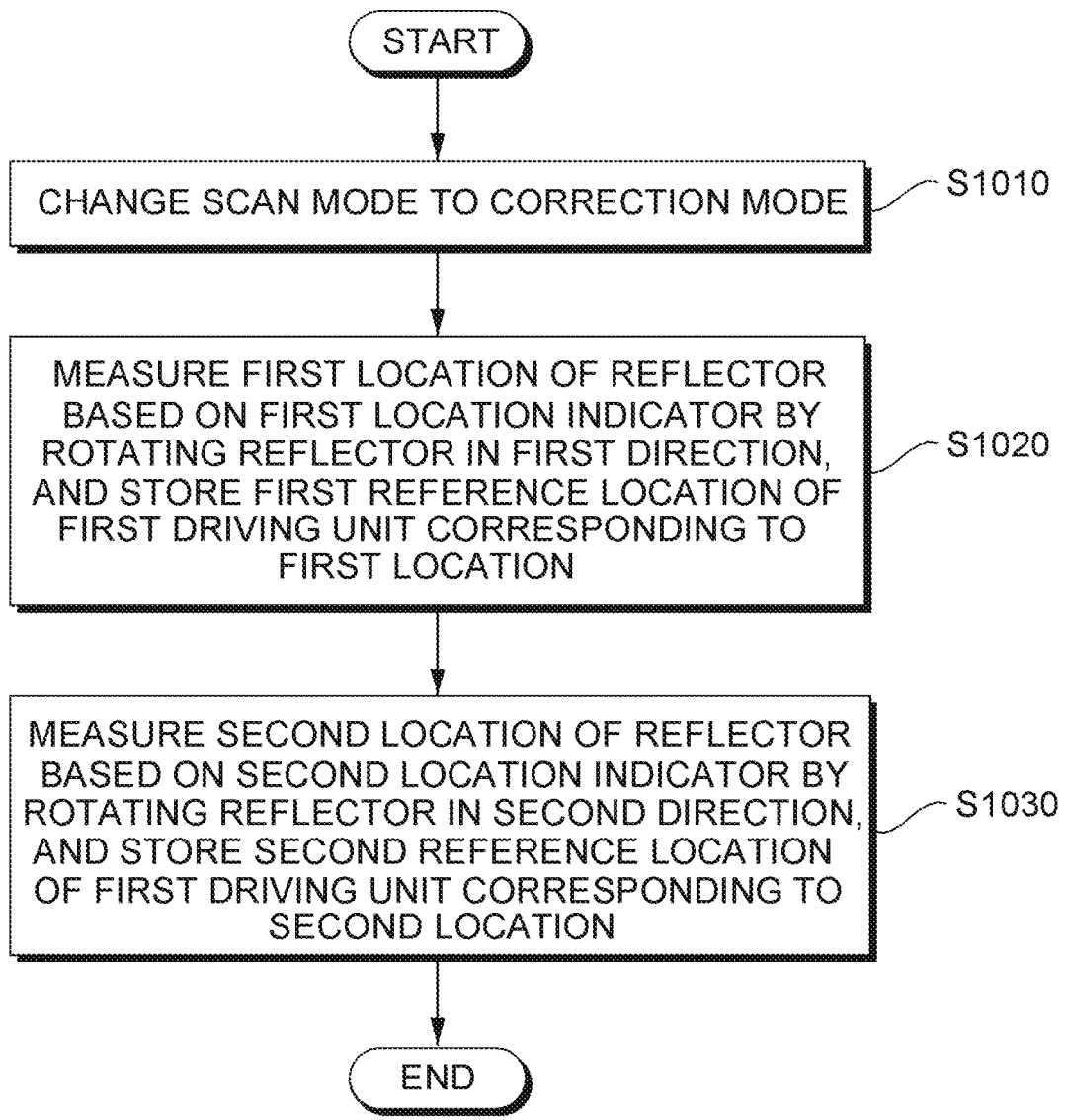
FIGS. 26 and 27 are flowcharts illustrating an example of operation of the optical transceiver according to other exemplary embodiments of the present invention.
Figure 27:
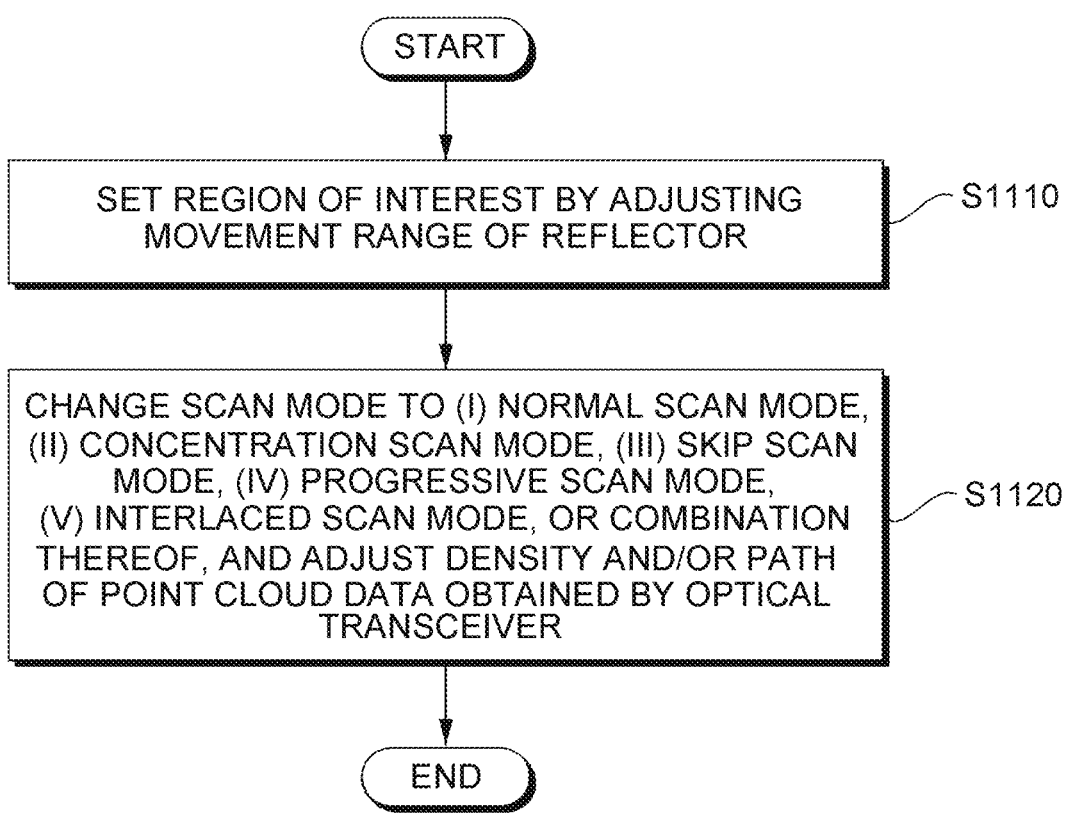

FIGS. 26 and 27 are flowcharts illustrating an example of an operation of the optical transceiver according to other exemplary embodiments of the present invention.

In operation S1010, the optical transceiver changes a scan mode to a correction mode. The optical transceiver performs the correction when a check is performed before the start of the scan or during the scan.

When the scan mode is changed to the correction mode, the optical transceiver rotates the reflector in the first direction and measures a first location of the reflector based on the first location indicator in operation S1020. The controller stores a first reference location of the first driving unit corresponding to the first location.

When the scan mode is changed to the correction mode, the optical transceiver rotates the reflector in the second direction and measures a second location of the reflector based on the second location indicator in operation S1030. The controller stores a second reference location of the first driving unit corresponding to the second location.

The controller transmits a signal controlling operation of the first angle adjusting unit or controlling operation of the second angle adjusting unit to the respective unit thereof. The controller corrects the first reference location and the second reference location of the first driving unit in the correction mode.

When the number of times the direction of the motor is shifted increases, the motor and the reflector may become misaligned. When only the rotation angle of the motor or the rotation angle of the reflector is measured in such a misaligned state, the reflector may collide with the stopper. The optical transmitter periodically sets initial values of both ends of the motor corresponding to the locations of both ends of the reflector by measuring an actual location of the reflector using the location indicator. This corresponds to a sort of fallback function.

The optical transceiver or the controller acquires point cloud data according to time flow in the scan mode. It is necessary to increase the number of elements of valuable data in a situation where the sampling period is limited. In the case of a travelling application that finds a minimum cost path on a plane according to limitations, it is necessary to adjust the angle to acquire the range of an object in a plane. The optical transceiver may easily change the pitching range of the reflector. For example, when the horizontal field of view is programmable from −45° to 0° from a predetermined reference angle, scanning is possible in a partial angle range.

In operation S1110, the optical transceiver or the controller sets a region of interest for acquiring the point cloud data by adjusting the movement range of the first angle adjusting unit or the reflector. The scannable region is determined according to the range of the first angle of the reflector included in the first angle adjusting unit and the range of the second angle of the rotating body included in the second angle adjusting unit. The controller sets the region of interest corresponding to a part of the scannable region by adjusting the range of the first angle.

In operation S1120, the optical transceiver or the controller changes the first angle of the reflector included in the first angle adjusting unit. The optical transceiver or the controller may change the scan mode to (i) a normal scan mode, (ii) a concentrated scan mode, (iii) a skip scan mode, (iv) a progressive scan mode, (v) an interlaced scan mode, or a combination thereof, and may adjust the density and/or path of the point cloud data acquired by the optical transceiver.

In the normal scan mode, the optical transceiver performs a line-scan at every reference angle interval and acquires the point cloud data. In the first angle adjusting unit, the range of the first angle corresponding to the rotation angle of the first driving unit or the range of the second gear angle corresponding to the rotation angle of the reflector rotates at a reference angle interval.

In the concentrated scan mode, the optical transceiver acquires the point cloud data at every angle interval for an interval narrower than the reference angle interval. In the first angle adjusting unit, the range of the first angle corresponding to the rotation angle of the first driving unit or the range of the second angle corresponding to the rotation angle of the reflector rotates at an angle interval narrower than the reference angle interval.

In the skip scan mode, the optical transceiver acquires the point cloud data at every angle for an interval wider than the reference angle interval or by skipping a specific angle range. In the first angle adjusting unit, the range of the first angle corresponding to the rotation angle of the first driving unit or the range of the second angle corresponding to the rotation angle of the reflector rotates at an angle interval wider than the reference angle interval, or rotates by skipping the specific angle range.

If the normal scan mode, the concentrated scan mode, and the skip scan mode can be considered as modes related to the scan interval, the progressive scan mode and the interlaced scan mode are the modes related to the scan order.

In the progressive scan mode, the optical transceiver acquires the point cloud data by line-scanning a plurality of lines in order.

In the progressive scan mode, when N lines (N is a natural number) are scanned in the region of interest, the optical transceiver maintains a direction of the first angle of movement of the reflector by sequentially increasing a line from the first line to the last line.

In the interlaced scan mode, the optical transceiver scans an intermediate line between the scanned lines and acquires the point cloud data.

In the interlaced scan mode, when N lines (N is a natural number) are scanned in the region of interest, the optical transceiver includes a section in which a direction of the first angle of movement of the reflector is switched by scanning the $K^{th}$ line, scanning the $L^{th}$ line, and scanning the $M^{th}$ line. K is a natural number less than N, L is a natural number greater than K and equal to or less than N, and M is a natural number less than N. K and M are different natural numbers. The optical transceiver is operated in a scheme of intermittently skipping a line and scanning a line which has not been scanned to fill the line.

In the interlaced scan mode, the controller sets a line which is to be line-scanned by the optical transceiver in the region of interest to B×P+Q, where P is a line scan interval at t, B is a positive sign or a negative sign, and Q is a line that is line-scanned at t−1. P includes a value set to be greater or less than the interval at which the line scanning is performed at t−1 under a predetermined condition, and B is changed from a positive sign to a negative sign or from a negative sign to a positive sign at specific t under a predetermined condition. Herein, the condition may be set with a predetermined turn, the last line of the region of interest, and the like.

For example, when the horizontal field of view is settable to −45° to 0° from the predetermined reference angle, the horizontal field of view may be changed to 0° →−5° →−10°→−20°→−25°→−30°→−27.5°→−22.5°→−17.5°→−12.5°→−7.5° →−2.5° → . . . .

Figure 28:
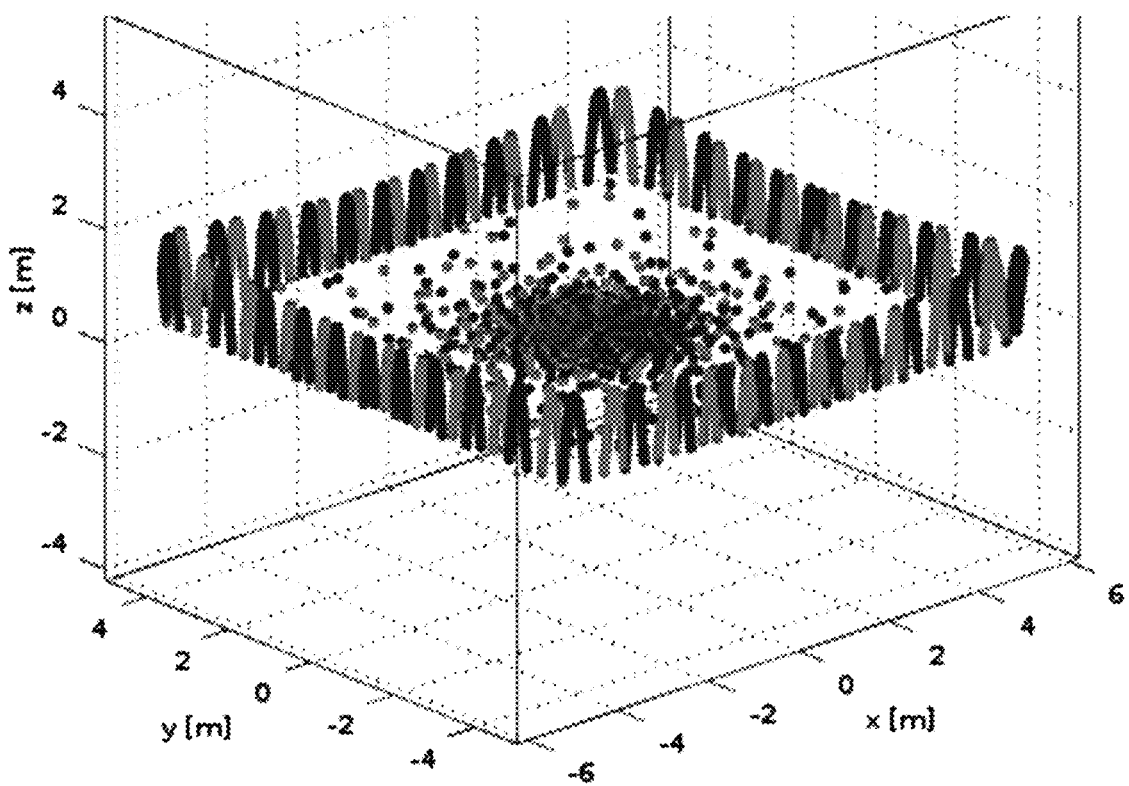
FIGS. 28 to 30 are diagrams illustrating an example of point cloud data obtained by the optical transceiver according to other exemplary embodiments of the present invention.
Figure 29:
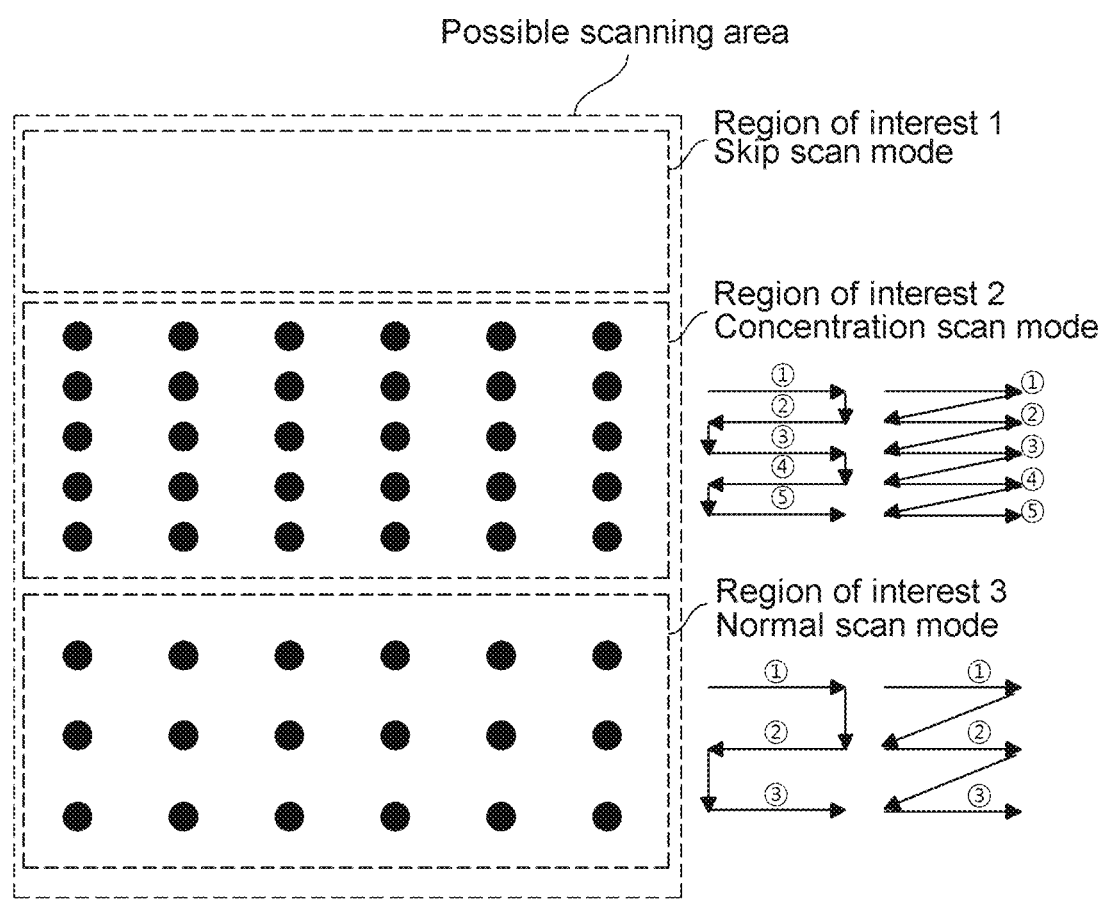
Figure 30:
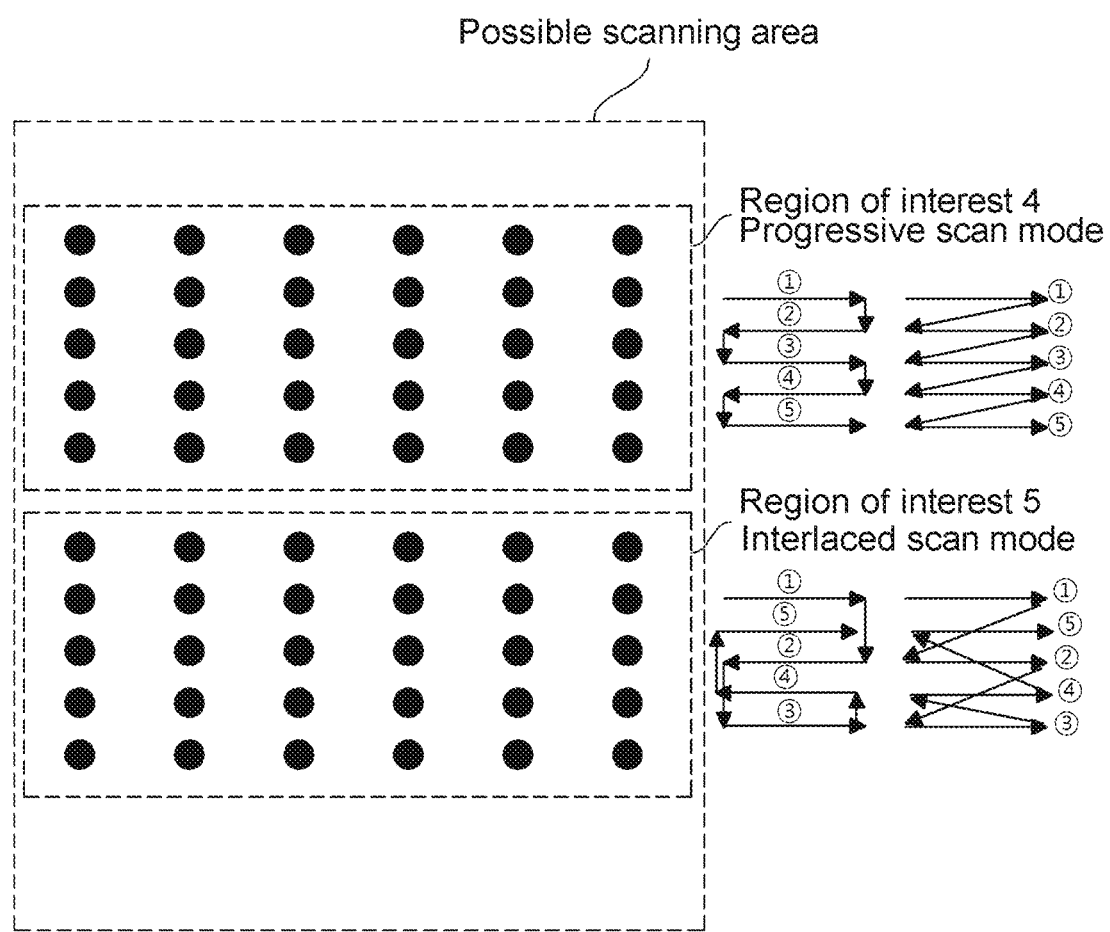

FIGS. 28 to 30 are diagrams illustrating an example of the point cloud data obtained by the optical transceiver according to other exemplary embodiments of the present invention.

The location unit of the 3D point cloud data illustrated in FIG. 28 is meters. The distance measuring device may acquire point cloud data for a floor surface and a wall surface.

Referring to point cloud data illustrated in FIG. 29, the optical transceiver may adjust the acquisition density of the point cloud data by using the first angle adjusting unit. The optical transceiver may acquire point cloud data with various densities for a predetermined time by setting region of interest 1 in the skip scan mode, setting region of interest 2 in the concentrated scan mode, and setting region of interest 3 in the normal scan mode.

Referring to the point cloud data illustrated in FIG. 30, the optical transceiver may adjust the path of acquisition of the point cloud data using the first angle adjusting unit. The optical transceiver may acquire point cloud data through various paths for a predetermined time by setting region of interest 4 in the progressive scan mode, and setting region of interest 5 in the interlaced scan mode.

The plurality of constituent elements included in the LIDAR sensor (optical transceiver) and the distance measuring device may be combined with one another to be implemented as at least one module. The constituent elements are connected to a communication path connected to a software module or a hardware module inside a device and operate organically with one another. The constituent elements communicate by using one or more communication buses or signal lines.

The distance measuring device and the distance measuring unit may be implemented within a logic circuit by hardware, firmware, software, or a combination thereof, and may also be implemented using a general-purpose or specific-purpose computer. The device may be implemented by a hardwired device, a Field Programmable Gate Array (FPGA), an Application Specific Integrated Circuit (ASIC), and the like. Further, the device may be implemented by a System on Chip (SoC) including one or more processors and controllers.

The distance measuring device and the distance measuring unit may be mounted in a computing device equipped with hardware elements in the form of software, hardware, or a combination thereof. The computing device may mean various devices including the entirety or a part of a communication device, such as a communication modem for performing communication with various devices, or a wired/wireless communication network, a memory storing data for executing a program, and a microprocessor for executing a program, performing calculations and giving commands.

The operation according to the present exemplary embodiments may be implemented in the form of a program command performable through various computer means and may be recorded in a computer readable medium. The computer readable medium indicates a predetermined medium participating in the provision of a command to a processor for execution. The computer readable medium may include a program command, a data file, a data structure, or a combination thereof. For example, the computer readable medium may include a magnetic medium, an optical recording medium, and a memory. A computer program may be distributed to computer systems connected through a network, so that a computer readable code may be stored and executed by a distribution method. Functional programs, codes, and code segments for implementing the present exemplary embodiment may be easily inferred by programmers of ordinary skill in the technical field of the present exemplary embodiment.

The present exemplary embodiments are for the purpose of describing the technical spirit of the present exemplary embodiment, and the range of the technical spirit of the present exemplary embodiment is not limited by the exemplary embodiment. The protective range of the present exemplary embodiment shall be interpreted by the accompanying claims, and all of the technical spirit within the equivalent range of the claims shall be interpreted to be included in the scope of the present exemplary embodiment.

As described above, the exemplary embodiments have been described and illustrated using the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An optical transceiver, comprising:
a first angle adjusting unit having a first reflection region and a second reflection region;
an optical transmitter configured to transmit light to the first reflection region of the first angle adjusting unit;
an optical receiver configured to receive light from the second reflection region of the first angle adjusting unit;
a first light blocking member configured to separate a movement path of the transmitted light and a movement path of the received light; and
a controller configured to transmit a signal controlling an operation of the first angle adjusting unit to the first angle adjusting unit, wherein the first angle adjusting unit includes:
a reflector having the first reflection region and the second reflection region;
a first driving unit configured to transfer power to the reflector;
a first gear connected to the first driving unit; and
a second gear connected to the reflector and moving while being engaged with the first gear,
wherein the first driving unit rotates in a first direction or a second direction within a range of a first gear angle set by the controller,
the first gear connected to the first driving unit rotates in the first direction or the second direction,
the second gear engaged with the first gear rotates in the first direction or the second direction, and
the reflector connected with the second gear moves within a range of a predetermined second gear angle.

2. An optical transceiver, comprising:
a first angle adjusting unit having a first reflection region and a second reflection region;
an optical transmitter configured to transmit light to the first reflection region of the first angle adjusting unit;
an optical receiver configured to receive light from the second reflection region of the first angle adjusting unit;
a first light blocking member configured to separate a movement path of the transmitted light and a movement path of the received light; and
a controller configured to transmit a signal controlling an operation of the first angle adjusting unit to the first angle adjusting unit, wherein the first angle adjusting unit includes:

a reflector having the first reflection region and the second reflection region;
a first driving unit configured to transfer power to the reflector;
a first gear connected to the first driving unit; and
a second gear connected to the reflector and moving while being engaged with the first gear, wherein the second gear includes a hole shaped like an arc, and a stopper installed in a frame of the optical transceiver crosses the arc-shaped hole.

3. An optical transceiver, comprising:
a first angle adjusting unit having a first reflection region and a second reflection region;
an optical transmitter configured to transmit light to the first reflection region of the first angle adjusting unit;
an optical receiver configured to receive light from the second reflection region of the first angle adjusting unit;
a first light blocking member configured to separate a movement path of the transmitted light and a movement path of the received light; and
a controller configured to transmit a signal controlling an operation of the first angle adjusting unit to the first angle adjusting unit,
wherein the first angle adjusting unit includes:
a reflector having the first reflection region and the second reflection region;
a first driving unit configured to transfer power to the reflector;
a first gear connected to the first driving unit; and
a second gear connected to the reflector and moving while being engaged with the first gear,
wherein the optical transceiver further comprises:
an elastic body which is connected to the first gear or the second gear and is installed in a frame of the optical transceiver,
wherein the elastic body is relaxed or contracted to decrease backlash between the first gear and the second gear.

4. An optical transceiver, comprising:
a first angle adjusting unit having a first reflection region and a second reflection region;
an optical transmitter configured to transmit light to the first reflection region of the first angle adjusting unit;
an optical receiver configured to receive light from the second reflection region of the first angle adjusting unit;
a first light blocking member configured to separate a movement path of the transmitted light and a movement path of the received light; and
a controller configured to transmit a signal controlling an operation of the first angle adjusting unit to the first angle adjusting unit,
wherein the first angle adjusting unit includes:
a reflector having the first reflection region and the second reflection region;
a first driving unit configured to transfer power to the reflector;
a first gear connected to the first driving unit; and
a second gear connected to the reflector and moving while being engaged with the first gear,
wherein the optical transceiver further comprises:
a second angle adjusting unit,
wherein the second angle adjusting unit includes:
a rotating body, to which the first angle adjusting unit is attached and which rotates;
a second driving unit connected to the rotating body to rotate the rotating body; and
a rotating body connecting unit configured to connect a base and the rotating body of the optical transceiver.

5. The optical transceiver of claim 4, wherein the rotating body connecting unit includes a data communication unit which is wirelessly connected with the rotating body inside the rotating body and transmits data, and
a second light blocking member is installed in the data communication unit so that data wirelessly transmitted from the data communication unit does not interfere with light of the light transmitter or light of the light receiver.

6. The optical transceiver of claim 4, wherein the rotating body connecting unit includes a power transfer unit which wirelessly transfers power by using a first coil and a second coil inside the rotating body, and
the first coil connected to the base of the optical transceiver and the second coil connected to the rotating body are isolated from a metal part by a third light blocking member.

7. The optical transceiver of claim 4, wherein the controller transmits a signal controlling an operation of the second angle adjusting unit to the second angle adjusting unit, and
the controller acquires point cloud data according to a time flow in a scan mode, and sets a region of interest for acquiring the point cloud data by adjusting a movement range of the first angle adjusting unit.

8. The optical transceiver of claim 7, wherein a scan available region is determined according to a range of a first angle of the reflector included in the first angle adjusting unit and a range of a second angle of the rotating body included in the first angle adjusting unit, and
the controller sets a region of interest corresponding to a part of the scan available region by adjusting the range of the first angle.

9. The optical transceiver of claim 7, wherein the controller changes a first angle of the reflector included in the first angle adjusting unit, and
the controller changes the scan mode to (i) a normal scan mode, (ii) a concentrated scan mode, (iii) a skip scan mode, (iv) a progressive scan mode, (v) an interlaced scan mode, or a combination thereof and adjusts density and/or a path of the point cloud data acquired by the optical transceiver.

10. The optical transceiver of claim 9, wherein in the normal scan mode, the optical transceiver acquires the point cloud data by performing line-scanning at every reference angle interval,
in the concentrated scan mode, the optical transceiver acquires the point cloud data at every angle for an interval narrower than a reference angle interval,
in the skip scan mode, the optical transceiver acquires the point cloud data at every angle for an interval wider than the reference angle interval or by skipping a specific angle range,
in the progressive scan mode, the optical transceiver acquires the point cloud data by sequentially line-scanning a plurality of lines, and
in the interlaced scan mode, the optical transceiver acquires the point cloud data by scanning an intermediate line between the scanned lines.

11. An optical transceiver, comprising:
a first angle adjusting unit having a first reflection region and a second reflection region;
an optical transmitter configured to transmit light to the first reflection region of the first angle adjusting unit;

an optical receiver configured to receive light from the second reflection region of the first angle adjusting unit;

a first light blocking member configured to separate a movement path of the transmitted light and a movement path of the received light; and a controller configured to transmit a signal controlling an operation of the first angle adjusting unit to the first angle adjusting unit, wherein the first angle adjusting unit includes:

a reflector having the first reflection region and the second reflection region;

a first driving unit configured to transfer power to the reflector;

a first gear connected to the first driving unit; and a second gear connected to the reflector and moving while being engaged with the first gear, wherein the first angle adjusting unit includes a location sensor installed in a frame of the optical transceiver, and the location sensor transceives light with a location indicator attached to the reflector and detects whether the reflector is located at a predetermined location in a state where the second gear is rotated.

12. The optical transceiver of claim 11, wherein the location sensor includes a first location sensor and a second location sensor installed in a frame of the optical transceiver, the location indicator includes a first location indicator and a second location indicator installed in the reflector, the first location sensor transceives light with the first location indicator, and detects whether the reflector is located at a predetermined first location in a state where the second gear is rotated in a first direction, the second location sensor transceives light with the second location indicator, and detects whether the reflector is located at a predetermined second location in a state where the second gear is rotated in a second direction, and when the optical transceiver is changed from a scan mode to a correction mode, the optical transceiver measures a first location of the reflector based on the first location indicator by rotating the reflector in the first direction and the controller stores a first reference location of the first driving unit corresponding to the first location, the optical transceiver measures a second location of the reflector based on the second location indicator by rotating the reflector in the second direction and the controller stores a second reference location of the first driving unit corresponding to the second location, and the controller corrects the first reference location and the second reference location.

13. The optical transceiver of claim 11, wherein a fourth light blocking member is installed in the location sensor so that light transceived by the location sensor does not interfere with light of the optical transmitter or light of the optical receiver.

14. A moving object, comprising:

a distance measuring device configured to calculate a time of flight between the moving object and a target object and measure a distance to the target object; and a moving device configured to move the moving object based on the distance to the target object, wherein the distance measuring device includes:

an optical transceiver configured to emit light to the target object by a start control signal, receive light reflected from the target object, and convert the received light into an electric signal; and a distance measuring unit configured to convert the electric signal to generate a stop control signal, and calculate a time of flight based on a time difference between the start control signal and the stop control signal, and measure a distance, the optical transceiver includes:

a first angle adjusting unit having a first reflection region and a second reflection region;

an optical transmitter configured to transmit light to the first reflection region of the first angle adjusting unit;

an optical receiver configured to receive light from the second reflection region of the first angle adjusting unit;

a first light blocking member configured to separate a movement path of the transmitted light and a movement path of the received light; and a controller configured to transmit a signal controlling an operation of the first angle adjusting unit to the first angle adjusting unit, and the first angle adjusting unit includes:

a reflector having the first reflection region and the second reflection region;

a first driving unit configured to transfer power to the reflector;

a first gear connected to the first driving unit; and a second gear connected to the reflector and moving while being engaged with the first gear.

* * * * *